United States Patent
Yoshida et al.

(10) Patent No.: US 7,408,869 B2
(45) Date of Patent: Aug. 5, 2008

(54) OPTICAL DISK AND OPTICAL DISK APPARATUS

(75) Inventors: Nobuhisa Yoshida, Kamakura (JP); Koji Takazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 676 days.

(21) Appl. No.: 10/803,057

(22) Filed: Mar. 18, 2004

(65) Prior Publication Data

US 2004/0196776 A1 Oct. 7, 2004

(30) Foreign Application Priority Data

Apr. 4, 2003 (JP) ............................. 2003-102153

(51) Int. Cl.
*G11B 7/24* (2006.01)

(52) U.S. Cl. .................... 369/275.1; 369/288; 369/286; 428/64.4

(58) Field of Classification Search ............. 369/59.22, 369/285, 275.1–275.5, 286, 288; 428/64.1–64.6, 428/694 ML; 430/270.13
See application file for complete search history.

(56) References Cited

U.S. PATENT DOCUMENTS

| 4,990,386 A | | 2/1991 | Washiyama et al. |
| 5,176,859 A | | 1/1993 | Leffew |
| 6,207,247 B1 | * | 3/2001 | Morita ....................... 428/64.1 |
| 6,339,574 B1 | * | 1/2002 | Kashihara ................ 369/59.22 |
| 6,436,503 B1 | * | 8/2002 | Cradic et al. ............... 428/64.1 |
| 6,537,636 B1 | | 3/2003 | Wisnudel et al. |
| 6,827,999 B2 | * | 12/2004 | Ito et al. ..................... 428/64.1 |
| 2002/0110067 A1 | * | 8/2002 | Kondo et al. ............. 369/47.54 |
| 2002/0172139 A1 | * | 11/2002 | Kondo et al. ............. 369/275.4 |
| 2003/0224215 A1 | * | 12/2003 | Kondo et al. .......... 428/694 ML |
| 2004/0115559 A1 | * | 6/2004 | Kato et al. ............. 430/270.13 |

FOREIGN PATENT DOCUMENTS

| EP | 0 395 885 A2 | 11/1990 |
| EP | 0 794 209 A2 | 9/1997 |
| EP | 1 193 274 A1 | 4/2002 |
| JP | 8-263874 | 10/1996 |
| JP | 2000-67468 | 3/2000 |
| JP | 2000-99997 | 4/2000 |
| JP | 2000-322767 | 11/2000 |
| JP | 2001-126311 | 5/2001 |
| JP | 2002-304770 | 10/2002 |
| WO | WO 01/16950 A1 | 3/2001 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

In an optical disk of the invention composed of two substrates bonded to each other, the level of double refraction is set to 60 nm or less in a read-only disk, to 60 nm or less in a write-once type disk, and to 40 nm or less in a rewritable type disk, respectively.

6 Claims, 25 Drawing Sheets

FIG. 10A -Prior Art-  Sample series of equalized signal and series selected by Viterbi decoder FIG. 10B -Prior Art-  Signal level of selected series FIG. 10C -Prior Art-  Decoded data ☐ : Data area
▨ : System lead-in area
▧ : Connection area
▦ : Data lead-in area
▒ : Middle area
▨ : Data lead-out area
▦ : System lead-out area Table explaining recorded data density of respective regions in reproduction-only information recording medium of the present invention

| Parameter | | Single layer | Dual layer |
|---|---|---|---|
| · User data capacity | | 15 Gbytes/side | 30 Gbytes/side |
| · Wavelength of laser diode | | 405 nm | |
| · Numerical aperture of objective lens | | 0.65 | |
| · Data bit length | System lead-in area | 0.306 μm | |
| | Data lead-in area<br>Data area<br>Data lead-out area | 0.153 μm | |
| · Channel bit length | System lead-in area | 0.204 μm | |
| | Data lead-in area<br>Data area<br>Data lead-out area | 0.102 μm | |
| · Minimum mark length | System lead-in area | 0.408 μm | |
| | Data lead-in area<br>Data area<br>Data lead-out area | 0.204 μm | |
| · Maximum mark length | System lead-in area | 2.652 μm | |
| | Data lead-in area<br>Data area<br>Data lead-out area | 1.326 μm | |
| · Track pitch | System lead-in area | 0.68 μm | |
| | Data lead-in area<br>Data area<br>Data lead-out area | 0.40 μm | |
| · Disc diameter | | 120 mm | |
| · Disc thickness | | 1.20 mm | |
| · Cover layer thickness | | 0.6 mm | |
| · Central hole diameter | | 15.0 mm | |
| · Data area inside diameter | | 24.1 mm | |
| · Data area diameter | | 58.0 mm | |
| · User data/sector<br>· Error correction code<br>· ECC restriction sector<br>· Modulation | | 2048 bytes<br>Leas Solomom product signal<br>RS(208, 192, 17) × RS(182, 172, 11)<br>32 sectors<br>ETM, RLL(1, 10) | |
| · Correctable burst error length | | 7.1 mm | |
| · Reference scan speed | | 6.61 m/s | |
| · Channel bit rate to reference speed | System lead-in area | 32.40 Mbps | |
| | Data lead-in area<br>Data area<br>Data lead-out area | 64.80 Mbps | |
| · User bit rate to reference speed | System lead-in area | 18.28 Mbps | |
| | Data lead-in area<br>Data area<br>Data lead-out area | 36.55 Mbps | |

FIG. 16

View explaining data arangement in control data zone of reproduction-only/write-once type/rewritable type information recording medium

| Physical format information |
| Disc manufacturer's information |
| Reservation |

FIG. 17

View explaining contents of information in physical format reproduction-only information recording medium

| BP | Contents | Number of bytes |
|---|---|---|
| 0 | Type of specification and type of part | 1bytes |
| 1 | Disc size and maximum transfer speed of disc | 1bytes |
| 2 | Disc structure | 1bytes |
| 3 | Recording density | 1bytes |
| 4 to 15 | Data area allocation | 12bytes |
| 16 | BCA adapter | 1bytes |
| 17 to 2047 | Reseration | 2031bytes |

FIG. 18

(BP 0) Type of specification and type of part
b7　　b6　　b5　　b4　　b3　　b2　　b1　　b0

| Type of specification | Type of part |

FIG. 19

(BP 1) Disc size and maximum transfer speed of disk
b7　　b6　　b5　　b4　　b3　　b2　　b1　　b0

| Disc size | Maximum transfer speed of disk |

FIG. 20

(BP 2) Disc structure

| b7 | b6 b5 | b4 | b3 b2 b1 b0 |
|---|---|---|---|
| Reservation | Number of layers | Track path | Layer type |

FIG. 21

(BP 3) Recording density

| b7 b6 b5 b4 | b3 b2 b1 b0 |
|---|---|
| Liner density | Track density |

FIG. 22

View explaining contents of data area llocation information in reproduction-only/write-once type/rewritable type information recording medium

| BP | SL | PTP | OTP | Number of byte |
|---|---|---|---|---|
| 4 | 00h | | | 1bytes |
| 5 to 7 | Number of pysical sector at the start of data area (03 0000h) | | | 3bytes |
| 8 | 00h | | | 1bytes |
| 9 to 11 | Number of pysical sector at the end of data area | | | 3bytes |
| 12 | 00h | | | 1bytes |
| 13 to 15 | 00 0000h | | Number of pysical sector at the end of layer 0 | 3bytes |

FIG. 23

(BP 16) BCA descriptor

| b7 | b6 b5 b4 b3 b2 b1 b0 |
|---|---|
| BCA flag | Reservation |

FIG. 24

View explaining recorded data density in respective areas of rewritable type information recording medium

| Parameter | | Single layer |
|---|---|---|
| • User data capacity | | 20 Gbytes/side |
| • Wavelength of laser diode | | 405 nm |
| • Numerical aperture of objective lens | | 0.65 |
| • Data bit length | System lead-in area | 0.306 μm |
| | Data lead-in area<br>Data area<br>Data lead-out area | 0.130 to 0.140 μm |
| • Channel bit length | System lead-in area | 0.204 μm |
| | Data lead-in area<br>Data area<br>Data lead-out area | 0.087 to 0.093 μm |
| • Minimum mark length (2T) | System lead-in area | 0.408 μm |
| | Data lead-in area<br>Data area<br>Data lead-out area | 0.173 to 0.187 μm |
| • Maximum mark length (13T) | System lead-in area | 2.652 μm |
| | Data lead-in area<br>Data area<br>Data lead-out area | 1.126 to 1.213 μm |
| • Track pitch | System lead-in area | 0.68 μm |
| | Data lead-in area<br>Data area<br>Data lead-out area | 0.34 μm |
| • Physcial address | Data lead-in area<br>Data area<br>Data lead-out area | *WAP<br>*WAP = Wobble Address in Periodic position (Cyclic Wobble address) |
| • Disc diameter<br>• Disc thickness<br>• Central hole diameter<br>• Data area inside diameter<br>• Data area diameter | | 120 mm<br>1.20 mm<br>15.0 mm<br>24.1 mm<br>57.89 mm |
| • User data/sector<br>• Error correction code<br>• ECC restriction sector<br>• Modulation | | 2048 bytes<br>Leas Solomom product signal<br>RS(208, 192, 17)<br>× RS(182, 172, 11)<br>32 sectors<br>ETM, RLL(1, 10) |
| • Correctable burst error length | System lead-in area | 7.1 mm |
| | Data lead-in area<br>Data area<br>Data lead-out area | 6.0 mm |
| • Reference scan speed | System lead-in area | 6.61 m/s |
| | Data lead-in area<br>Data area<br>Data lead-out area | 5.64 to 6.03 m/s |
| • Channel bit rate to reference speed | System lead-in area | 32.40 Mbps |
| | Data lead-in area<br>Data area<br>Data lead-out area | 64.80 Mbps |
| • User bit rate to reference speed | System lead-in area | 18.28 Mbps |
| | Data lead-in area<br>Data area<br>Data lead-out area | 36.55 Mbps |

FIG. 25

View explaining data strucuture of lead-in area in rewritable type information recording medium

| | | Number of physical sector | |
|---|---|---|---|
| System Lead-in Area | Initial zone | 02 2640h | |
| | Buffer zone | 02 4B00h | |
| | Control data zone | 02 4F00h | |
| | Buffer zone | 02 6700h | |
| Conection Lead-in Area | Conection zone | 02 6AFFh | |
| Data Lead-in Area | Guard track zone | 02 9A00h | 82 9A00h |
| | Disc test zone | 02 A400h | 82 A400h |
| | Drive test zone | 02 B400h | 82 B400h |
| | Guard track zone | 02 CA00h | 82 CA00h |
| | Disc identification zone | 02 CD00h | 82 CD00h |
| | DMA1 & DMA2 | 02 CE00h | 82 CE00h |
| | Data zone | 03 0000h | 83 0000h |
| | | Land | Groove |

FIG. 26

View explaining structure in viterbi decoder

View explaining transition state of pr(1, 2, 2, 2, 1) channel Combined with ETM code View explaining path memory View explaining I/O of path memory cell View explaining configuration of path memory cell

OPTICAL DISK AND OPTICAL DISK APPARATUS

CROSS-REFERENCE TO RELATED APPLICATIONS

This application is based upon and claims the benefit of priority from prior Japanese Patent Application No. 2003-102153, filed Apr. 4, 2003, the entire contents of which are incorporated herein by reference.

BACKGROUND OF THE INVENTION

1. Field of the Invention

The present invention relates to an optical disk apparatus, which records and reproduces information on and from an information recording medium using a laser beam, an optical disk as an information recording medium, which can stably obtain a signal having a high. C/N ratio, and an optical disk apparatus.

2. Description of the Related Art

Optical discs have become widespread in various configurations such as a reproduction-only type as typified by a CD and a DVD-ROM, a write-once type as typified by a CD-R and a DVD-R, a rewritable type (a CD-RW, a DVD-RAM) as typified by an external memory of a computer and recording/reproducing video disk, and the like.

Recently, it is required to increase the capacity of an optical disk to cope with an abrupt increase in a recording capacity required for information and broadcast relating equipment. Accordingly, researches are executed to reduce the wavelength of a laser beam (to reduce the diameter of a converged light spot) and to make use of an ultra-resolution technology as well as a mastering technology of electron beam exposure and the like is examined to reduce a track pitch and a mark pit pitch.

Nowadays, a widely used DVD standard disk is formed in a thickness of 1.2 mm by molding 0.6 mm thick substrates by injection molding polycarbonate resin, forming a reflection film and a recoding film on the substrates, and then bonding two substrates to each other using ultraviolet ray curing resin (hereinafter, referred to as UV resin") and the like.

A DVD-RAM, for example, is commercialized to cope with a requirement for recording an MPEG2 image on a side of an optical disk having a diameter of 12 cm for at least two hours, and it is determined that the DVD-RAM has a memory capacity of 4.7 GB on one side, a track density of 0.74 µm/track, and a line density of 0.267 µm/bit. Further, a light beam used to record or reproduce information has a wavelength of 650 nm, and an objective lens assembled in an optical head has a numerical aperture of 0.6.

Incidentally, when a thin resin disk is formed by injection molding, it is difficult to completely eliminate optical anisotropy caused by the effect of mechanical strain remaining in a substrate when the disk is molded. Since known double refraction is caused by the optical anisotropy, phase retardation is caused by the double refraction, from which a problem arises in that the intensity of a reproduced signal is attenuated in an optical disk.

That is, when a light beam, which has a predetermined wavelength and polarization in a predetermined direction and is irradiated to an optical disk, is transferred therethrough and outgoes therefrom, the intensity of the light beam, which can be used as a reproduced signal, is reduced by the effect of the double refraction. Thus, in the DVD standard optical disk described above, the upper limit of double refraction is set to 100 nm.

Nowadays, it has been proposed to increase a recording density using a light beam having a short wavelength, for example, using a 405 nm light beam. In this case, the amplitude of a reproduced signal is more reduced by the reduction of the wavelength of the light beam even if double refraction has the same value.

Jpn. Pat. Appln. KOKAI Publication No. 2002-304770 relates to a method of prescribing the double refraction of an optical disk that uses a light beam having a wavelength of 400 nm and proposes to set the amount of variation of the double refraction to ±20 nmpp or less in the one round of the optical disk in its turning direction.

Further, Jpn. Pat. Appln. KOKAI Publication No. 2000-67468 reports to set the double refraction of a transparent film to 20 nm or less in an optical recording medium employing a system for bonding the transparent film on a base plate on which information is recorded.

As described above, when a light beam having a short wavelength is used to increase the recording capacity of an optical disk, a problem arises in that the amplitude of an reproduced signal from the optical disk is reduced and information is reproduce unstably.

The value of the double refraction defined in Jpn. Pat. Appln. KOKAI Publication No. 2002-304770 is actually the value of a single transparent sheet bonded to a support base plate, and thus the value is not a value that includes all the characteristics, which must be taken into consideration, such as a pattern transferring property, curling of a substrate, the thickness of the substrate, and the like from which an important problem arises in a molded substrate onto which a pattern is transferred by injection molding.

The value of the double refraction defined in Jpn. Pat. Appln. KOKAI Publication No. 2000-67468 is also the value of a single film bonded to a surface of a substrate through a bonding layer, and the value is not a value that includes all the characteristics, which must be taken into consideration, such as a pattern transferring property, curling of a substrate, the thickness of the substrate, and the like from which an important problem is caused in a molded substrate onto which a pattern is transferred by injection molding.

As described above, even if the value disclosed in the respective publications or any one of them is satisfied, the problem that the amplitude of the reproduced signal obtained from an optical disk is reduced and information is reproduced unstably is not solved.

When an optical disk, which includes high density pits and grooves and in which a light beam having a wavelength of 405 nm is used, is integrally molded by an injection molding mold, a more strict transferring property is required as compared with a DVD standard optical disk using a light beam having a wavelength of 650 nm. Accordingly, when, for example, the value of double refraction is defined, the magnitude of the amplitude of a reproduced signal must be also taken into consideration.

BRIEF SUMMARY OF THE INVENTION

According to the one of embodiment of the present invention, there is provided to an optical disk comprising a molded substrate molded by injection molding and having information marks transferred thereonto, on which a recoding film capable of recording information only once by a laser beam having a wavelength of 600 nm or less is formed, and to and from which information can be recorded and reproduced, or on which a reflection film is formed so as to reproduce information from the optical disk, wherein the magnitude of a double refraction component of the entire region of the optical disk is ±60 nm or less when measured by a double pass.

According to the one of embodiment of the present invention, there is provided to an optical disk apparatus that can record and reproduce information on and from an optical disk on which a recording film that can record information only once using a laser beam having a wavelength of 600 nm or less or that can reproduce information from an optical disk on which a reflection film is formed, wherein the magnitude of a double refraction component of the entire region of the optical disk is ±60 nm or less when measured by a double pass.

According to the one of embodiment of the present invention, there is provided to an optical disk comprising a molded substrate molded by injection molding and having information marks transferred thereto, on which a recoding film capable of recording and erasig information is formed, and on and from which information can be recorded and reproduced using a laser beam having a wavelength of 600 nm or less, wherein the magnitude of a double refraction component of the entire region of the optical disk is ±40 nm or less when measured by a double pass.

According to the one of embodiment of the present invention, there is provided to an optical disk apparatus that can record and reproduce information on and from an optical disk on which a recording film capable of recording and erasing information using a laser beam having a wavelength of 600 nm or less is formed, wherein the magnitude of a double refraction component of the entire region of the optical disk is ±40 nm or less when measured by a double pass.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a schematic view explaining the recording data densities in the respective areas of the reproduction-only optical disk;

FIG. 17 is a schematic view explaining an example of the data arrangement of the control data zone in respective types of optical discs;

FIG. 18 is a schematic view explaining the contents of information in the physical format of the reproduction-only optical disk;

FIG. 19 is a schematic view explaining an example of the contents of information (type of a written specification and type of parts) in the physical format shown in FIG. 18;

FIG. 20 is a schematic view explaining an example of the contents of information (disk size and disk maximum transfer speed) in the physical format shown in FIG. 18;

FIG. 21 is a schematic view explaining an example of the contents of information (disk structure) in the physical format shown in FIG. 18;

FIG. 22 is a schematic view explaining an example of the contents of information (recording density) in the physical format shown in FIG. 18;

FIG. 23 is a schematic view explaining the contents of data area allocation information in the respective types of the optical discs;

FIG. 24 is a schematic view explaining the contents of the data area allocation information (BCA descriptor) shown in FIG. 23;

FIG. 25 is a schematic view explaining the recording data densities in the respective regions of a recording/reproducing (rewritable type) optical disk;

FIG. 26 is a schematic view explaining the arrangements and the data structures of the data lead-in area and the system lead-in area of the rewritable optical disk;

DETAILED DESCRIPTION OF THE INVENTION

Embodiments of the present invention will be explained below in detail with reference to the drawings.

FIGS. 1 and 2 are schematic views for sequentially explaining processes for manufacturing an optical disk to which the embodiments of the present invention can be applied.

Figure 1A:
FIGS. 1A to 1E are schematic views showing processes for manufacturing an optical disk.

First, as shown in FIG. 1A, a glass plate having, for example, a diameter of 220 mm and a thickness of 6 mm is prepared, and a glass base plate 101 is obtained after a surface thereof is polished to a predetermined surface roughness and cleaned.

Figure 1B:
Figure 1C:
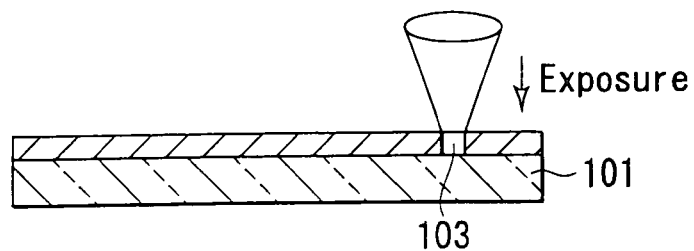

Next, a photoresist 102 is applied to the surface of the glass base plate 101 as shown in FIG. 1B, and then patterns 103 composed of guide grooves (concavo-convex portions), pits and the like is exposed using a base plate exposing machine using a gas laser having a wavelength of, for example, 351 nm as a light source as shown in FIG. 1C.

Figure 1D:
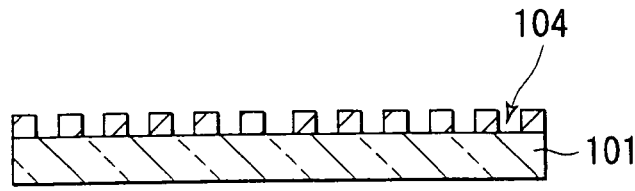

Next, the exposed glass base plate 101 is developed with an alkaline developer so as to eliminate the undeveloped portion of the photoresist, and patterns 104 composed of pits and the like is obtained as shown in FIG. 1D.

Figure 1E:
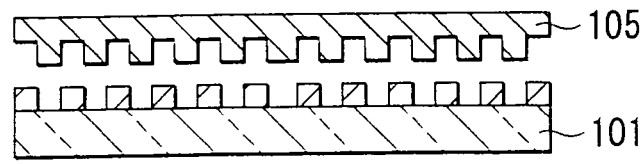

Subsequently, as shown in FIG. 1E, Ni or the like, for example, is plated on the glass base plate 101, and a stamper 105, to which the pattern 104 has been transferred, is obtained by exfoliating the Ni plating from the glass base plate 101.

Figure 2A:
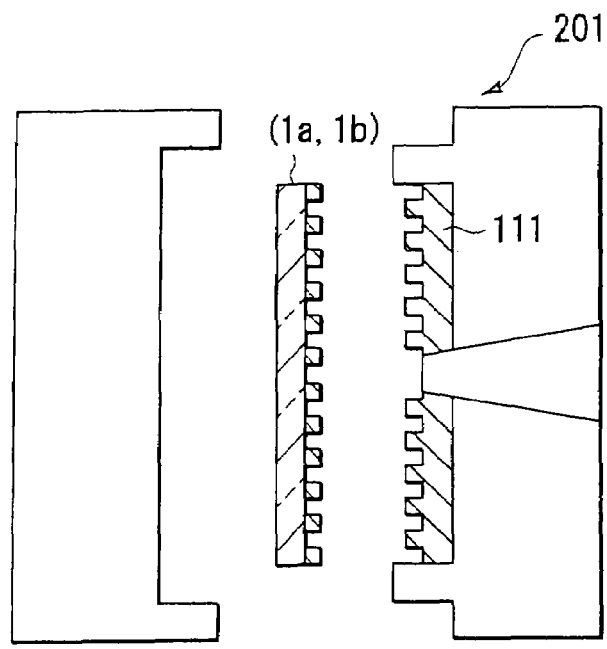
FIGS. 2A to 2C are schematic views showing processes subsequent to the process shown FIG. 1E.
Figure 3:
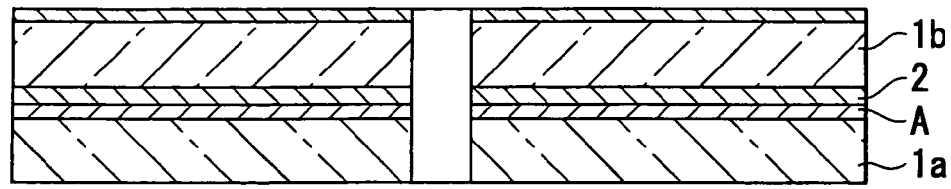
FIG. 3 is a schematic view showing an example of the sectional arrangement of the optical disk formed by the processes shown in FIGS. 1A to 1E and FIGS. 2A to 2C.

As shown in FIG. 2A, the stamper 105 is set to an injection molding machine 201, and injection molding is executed using the stamper 105 as a mold, thereby a resin molded plate, onto which the predetermined patterns composed of the guide grooves (concavo-convex portions, i.e., lands and grooves), the pits, and the like have been transferred, is obtained (the resin molded plate corresponds to a first substrate 1a or a second substrate 1b of an optical disk that will be explained below using FIG. 3). Note that, in many cases, the substrate (the resin molded plate 1a or 1b) is formed of polycarbonate.

Figure 2B:
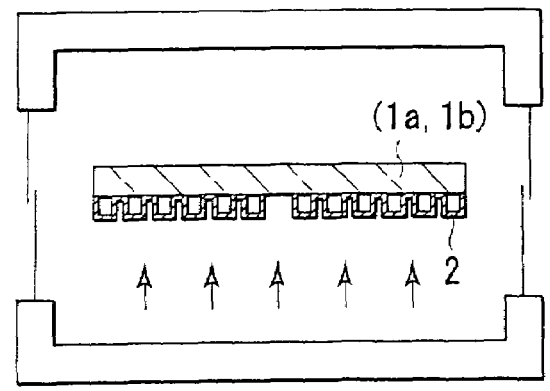

Subsequently, as shown in FIG. 2B, a metal or alloy film 2 is formed by, for example, a sputtering device or a dye film 2 is coated by a spinner according to a use of the optical disk and a type of the first and second substrates. For example, when the optical disk is a DVD-ROM, an Al or Ag reflection film 2 is formed, and when it is a DVD-RAM, a multi-layer recording film 2 is formed. A dummy substrate that is a flat plate, on which any of the patterns, the metal or alloy film, and the dye film 2 is formed, is also used as the substrate.

Figure 2C:
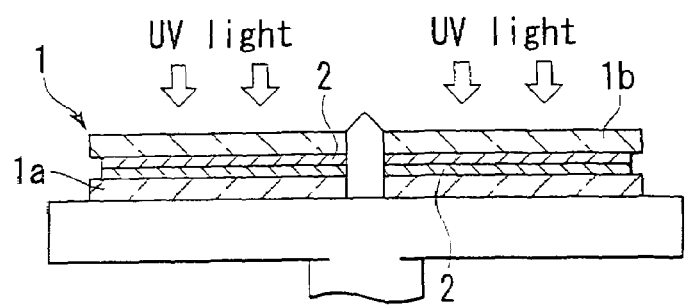

Subsequently, as shown in FIG. 2C, the substrate (1a or 1b) is mounted on the turntable of a spinner (not explained in detail), and a UV curing resin (not shown), which is cured by, for example, ultraviolet rays irradiated thereto, is applied to the substrate as a bonding agent. Then, the second substrate (1b), which is previously prepared in a different process, is set on the substrate (1a) and irradiated with ultraviolet (UV) rays (not explained in detail), thereby the two substrates (1a and 1b) are bonded to each other.

Note that, when the substrates 1a and 1b are molded, parameters, for example, the temperatures of the resin material and the stamper (mold) 5, a pressure when the resin material is injected, a cooling time, a mold separating speed when a mold is separated, and the like are optimized. With the above optimization, characteristics such as a pattern transferring property to the respective substrates (1a and 1b), the curling of a single substrate, the magnitude of double refraction in the substrates, the thicknesses of the substrates, and the like are set to predetermined values.

Incidentally, when the substrate is obtained by molding the resin by the processes explained with reference to FIGS. 1A to 1E, if the patterns are transferred to the substrate simultaneously with the molding of it, it is difficult to completely eliminate optical anisotropy that is caused by the effect of the mechanical strain remaining in the substrate.

Since double refraction is caused by the optical anisotropy as known well, when information is reproduced from the optical disk, various devices are made to secure the amplitude of a signal as described below.

Figure 5:
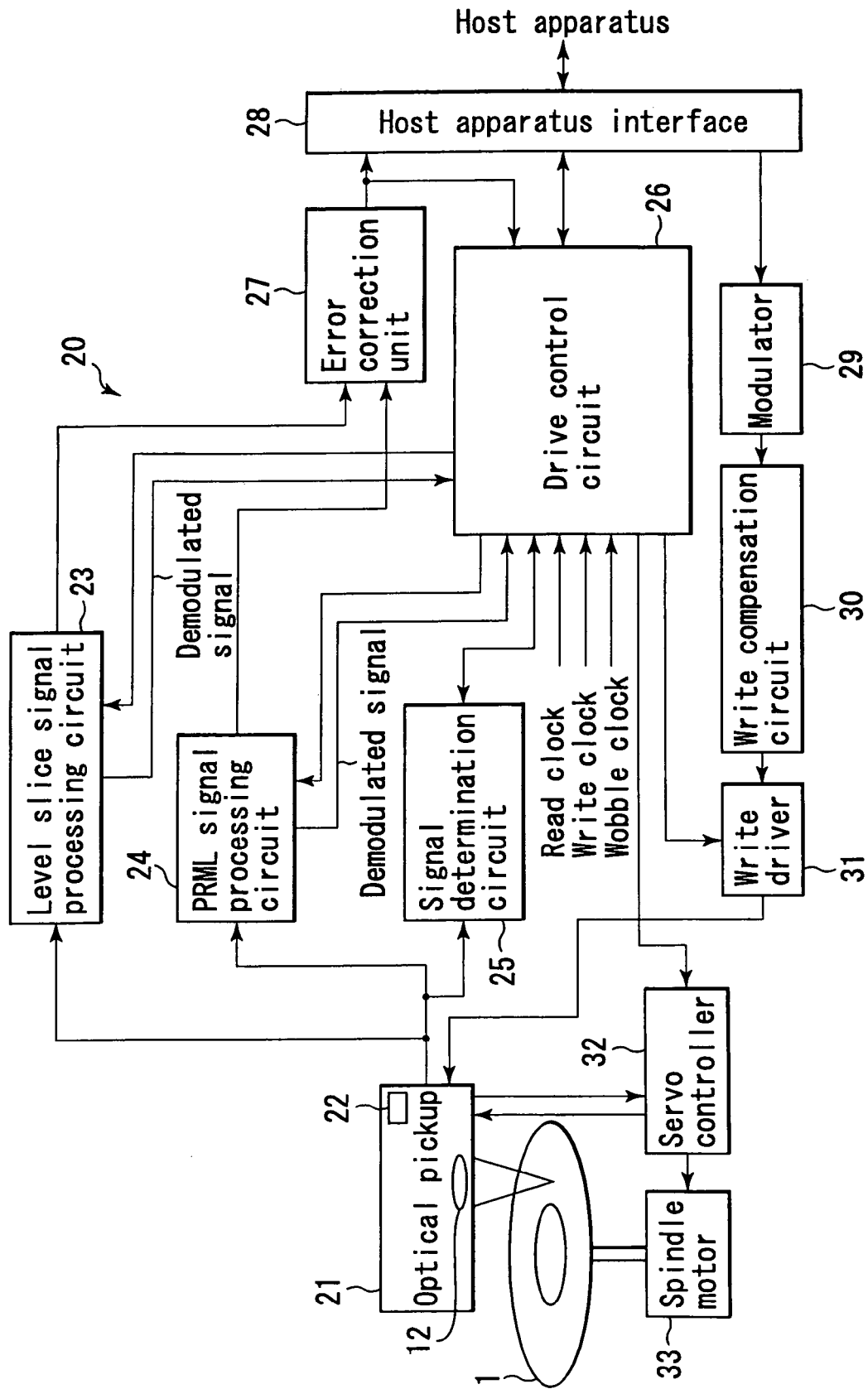
FIG. 5 is a view showing the schematic arrangement of an optical disk apparatus.

FIG. 5 is a schematic view showing an example of an optical disk apparatus that records information on the optical disk explained in FIG. 3 and reproduces the information recorded on the optical disk.

The optical disk apparatus 20 records the information, that is, data on the optical disk 1 which is the information recording medium or reproduces the data recorded on the optical disk 1.

The optical disk apparatus 20 includes an optical pickup (optical head) 21, a signal detection unit 22, which receives the laser beam reflected from the optical disk 1 and outputs a current having a magnitude corresponding to the intensity of the laser beam, a level slice signal processing circuit 23, a PRML (partial response and maximum likelihood) signal processing circuit 24, a signal determination circuit 25, a drive control circuit 26, an error correction unit 27, a host apparatus interface 28, a modulator 29, a write compensation circuit 30, a write driver 31, a servo controller 32, a spindle motor 33, and the like. Note that since the error correction unit 27, the host apparatus interface 28, and the modulator 29 are not components to which the embodiments of the present invention directly relate, the detailed explanation thereof is omitted.

The optical pickup 21 shown in FIG. 5 includes a semiconductor laser element (hereinafter, abbreviated as laser element) 11 that can emit a laser beam (light beam) having a predetermined wavelength, for example, a wavelength of 405 nm, an objective lens 12, which converges the laser beam emitted from the laser element 11 on the recording surface of the optical disk 1, a photo-detector 13 (signal detection unit 22), which receives the light (laser beam) reflected from the recording surface of the optical disk 1 and outputs a current corresponding to the intensity of the reflected light, and the like, as explained in FIG. 4.

The optical disk 1 is set to a damper (not shown) of the spindle motor 33 and turned by the spindle motor 33 so that a speed per a unit length of a pit (mark) train which indicates information has the same speed over the entire region of the optical disk 1.

A polarized beam splitter 14 and a retarder (quarter-wave plate) 15 are interposed between the objective lens 12 and the laser element 11. The polarized beam splitter 14 separates the light, which is directed from the laser element 11 to the optical disk 1, from the light, which is reflected on the recording surface of the optical disk 1, making use of reflection and transmission that depend on the direction of the polarizing surface of the laser beam, and the retarder (quarter-wave plate) 15 aligns the isolation between the light directed from the laser element 11 to the optical disk 1 and the light reflected on the recording surface of the optical disk 1.

The laser element 11 has a laser driver (not shown) and a write driver 31 connected thereto. The laser driver causes the laser element 11 to output a laser beam having a predetermined intensity, and the write driver 31 varies the intensity of the laser beam output from the laser element 11 according to the presence or absence of information to be recorded.

The laser beam output from the laser element 11 is converged onto the recording surface of the optical disk 1 through the objective lens 12.

When the optical disk 1 is an optical disk on which information can be recorded only once, a pit (mark) train is formed on the optical disk 1 by the converged laser beam when information is recorded. When the optical disk 1 is an optical disk on which information can be recorded and from which information can be erased, the phase of the optical disk 1 is varied when the information is recorded and a pit (mark) train is formed on the optical disk 1. Note that the pit (mark) train indicates information by the intervals between marks and the lengths of the respective marks.

When information is reproduced from the optical disk 1, the polarizing direction of the laser beam reflected by the optical disk 1 is varied depending on the presence or absence of the pit (mark) train.

The laser element 11 outputs a laser beam whose intensity corresponds to the magnitude of a laser drive current supplied from the write driver 31 according to an indication (power) set by the write compensation circuit 30. For example, a laser beam, which has the intensity of any of a reproducing power for obtaining a reproduced signal, a recording power for recording information, and an erasing power for erasing information, is output.

Figure 6:
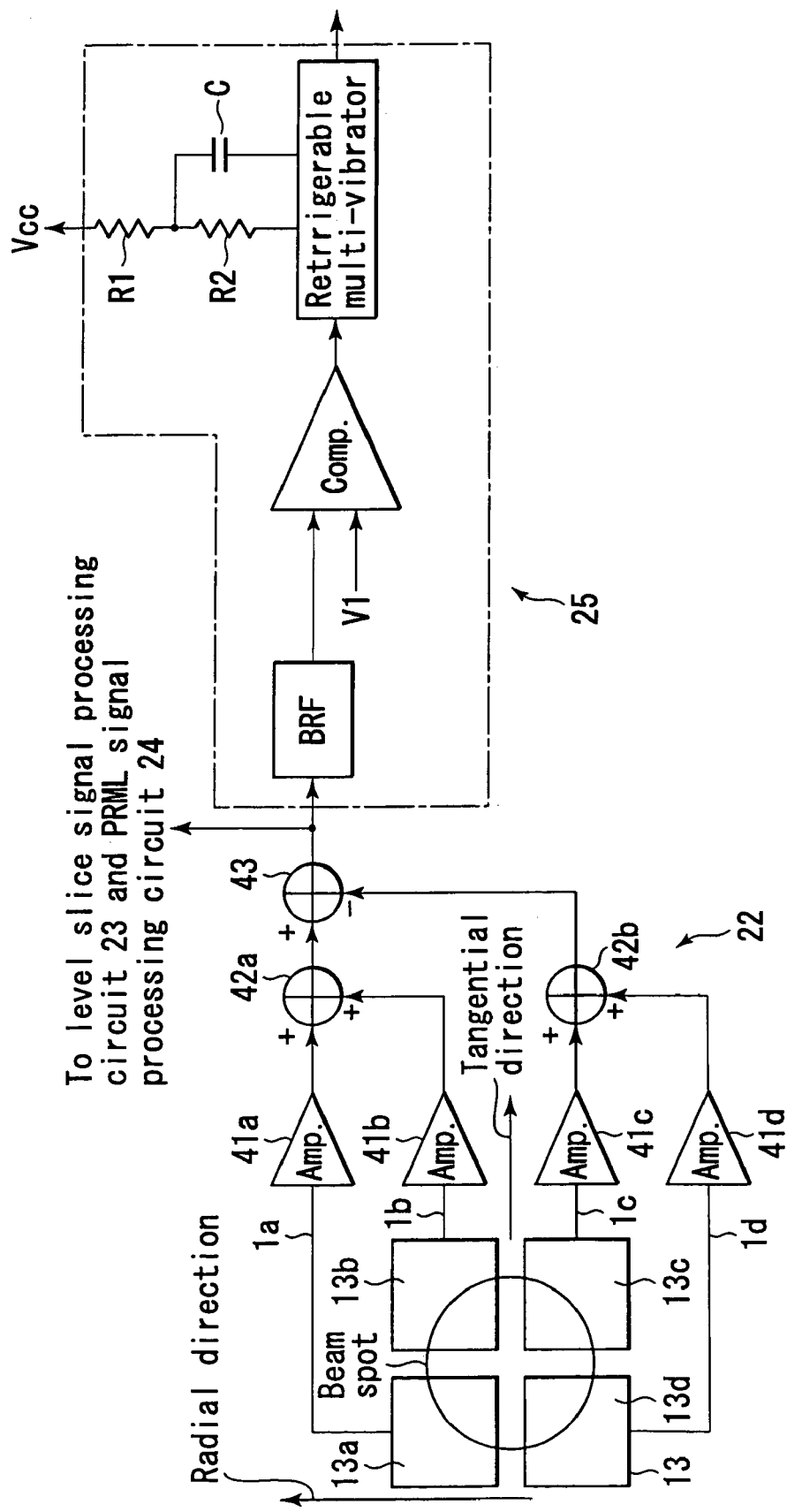
FIG. 6 is a circuit diagram showing the schematic arrangements of a signal detecting section and a signal determination circuit.

As shown in FIG. 6, the signal detection unit 22 (photo-detector 13) of the optical pickup 21 includes current/voltage converters (amplifiers) 41a, 41b, 41c, 41d, an adder 42a, an adder 42b, a subtracter 43, and the like. The current/voltage converters 41a, 41b, 41c, 41d convert the each detection signal (1a, 1b, 1c, 1d), which is supplied from arbitrary detecting regions (which are divided into four regions in this example, and the respective detecting regions are denoted by 13a, 13b, 13c, and 13d in a clockwise direction from the upper left detecting region 13a) of the photo-detector 13 acting as a photo-detector for detecting the laser beam, into the voltage signals from the current signals. The adder 42a adds the signals from the amplifiers 41a and 41b, the adder 42b adds the signals from the amplifiers 41c and 41d, and the subtracter 43 subtracts the signal from the adder 42a by the signal from the adder 42b.

The signal from the subtracter 43, that is, the signal output from the signal detection unit 22 is supplied to the level slice signal processing circuit 23 and the PRML signal processing circuit 24 that reproduce data.

Figure 7:
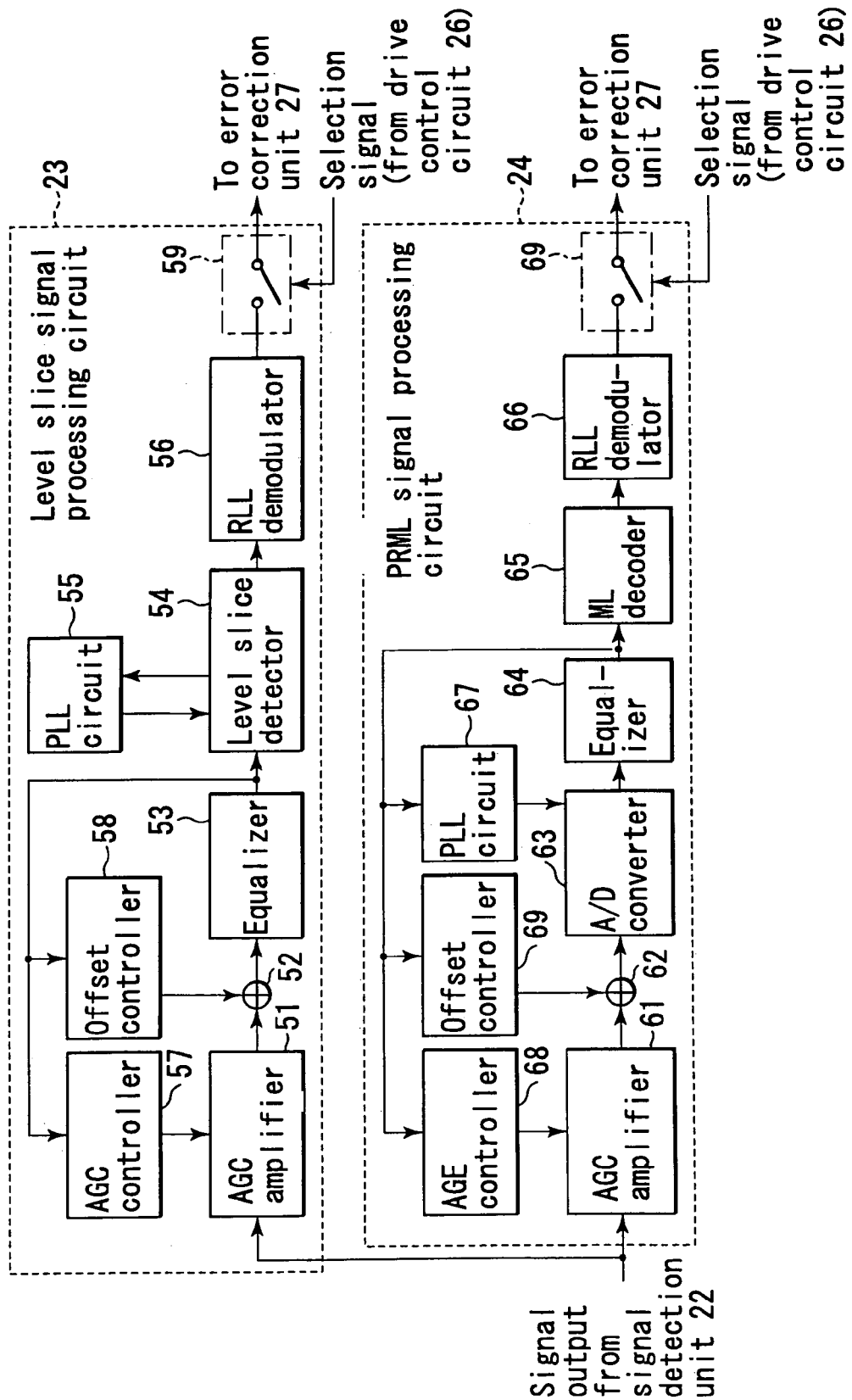
FIG. 7 is a block diagram showing the schematic arrangements of a level slice signal processing circuit and a PRML signal processing circuit.

As shown in FIG. 7, the level slice signal processing circuit 23 includes an AGC (automatic gain control) amplifier 51, an adder 52, an equalizer 53, a level slice detector 54, a PLL circuit 55, a RLL demodulator 56, an AGC controller 57, an offset controller 58, and the like.

The level of the signal supplied from the signal detection unit 22 (output obtained by subjecting the light reflected from the optical disk 1 to photoelectric conversion) is corrected by the AGC amplifier 51 based on the control signal from the AGC controller 57 and supplied to the adder 52.

The signal whose gain has been controlled by the AGC amplifier 51 is added to the offset signal from the offset controller 58 by the adder 52 and supplied to the equalizer 53.

The signal, to which the offset signal has been added by the adder 52, is subjected to waveform equalization (processing) by the equalizer 53 so that the intersecting point of a threshold value, which is previously set to the waveform (reproduced waveform) of a reproduced signal, and an equalized signal is caused to coincide with (or to approximate to) the center of a window, and then the signal is supplied to the level slice detector 54, the AGC controller 57, and the offset controller 58.

The level slice detector 54 detects the intersecting point of the equalized waveform from the equalizer 53 and the threshold value based on the channel clock from the PLL circuit 55, and when the intersecting point is detected in the window, binary data "1" is supplied to the RLL demodulator 56, and when the intersecting point is not detected in the window, binary data "0" is supplied to the RLL demodulator 56.

The PLL circuit 55 creates the channel clock based on the signal from the level slice detector 54 and supplies the channel clock to the RLL demodulator 56.

The RLL demodulator 56 demodulates the binary data from the level slice detector 54 based on an RLL code.

The AGC controller 57 sets an amount of correction in the AGC amplifier 51 based on the equalized waveform output whose waveform has been equalized by the equalizer 53.

The offset controller 58 supplies an offset value, which has been based on the equalized waveform output from the equalizer 53, to the adder 52.

Figure 8:
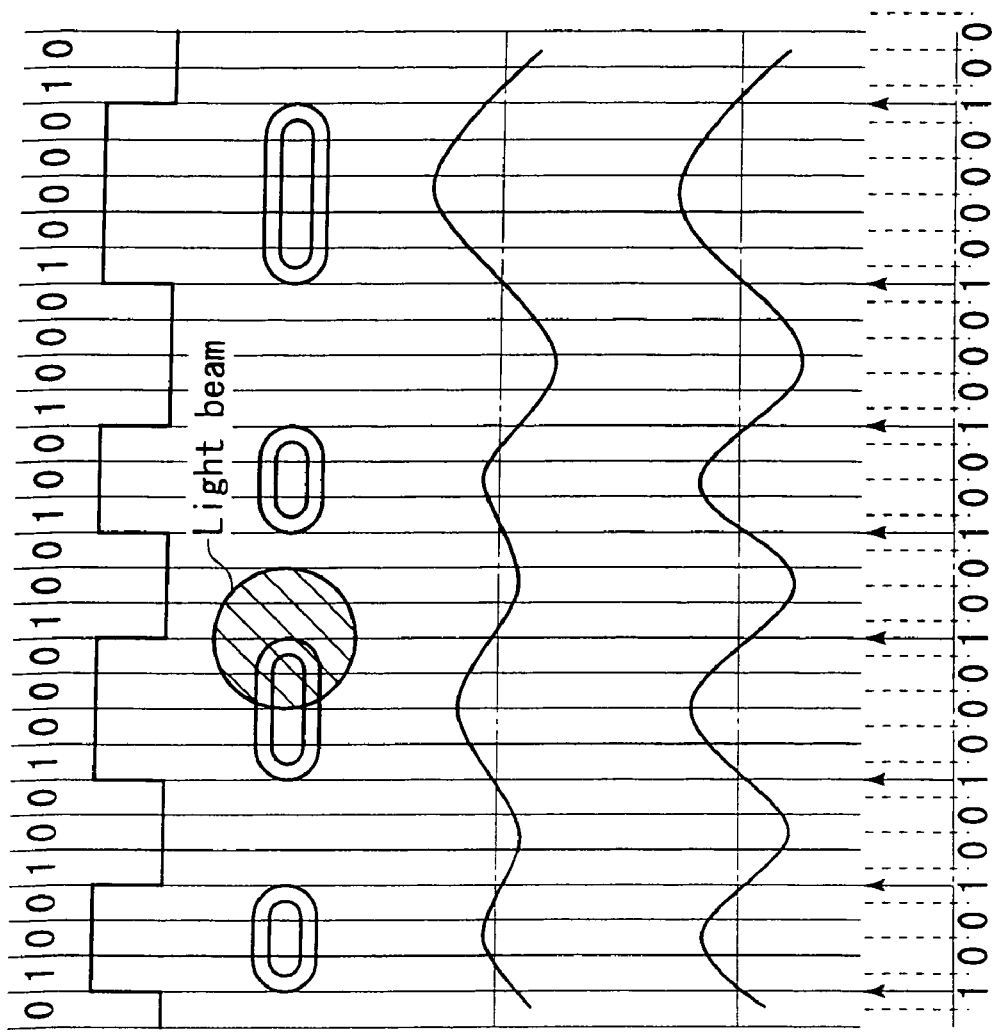
FIGS. 8A to 8F are schematic views showing the signal waveform and the data value of a main portion of the level slice signal processing circuit.

Next, an example of a waveform slice system, which is a signal processing system executed by the level slice signal processing circuit 23, will be explained using FIGS. 8A to 8G. FIG. 8A shows recording data, FIG. 8B shows a recording waveform, FIG. 8C shows the positional relationship between pits and a laser beam, FIG. 8D shows a reproduced waveform (which is an output from the signal detection unit 22), FIG. 8E shows an equalized waveform, and FIG. 8F shows intersecting point detecting binary data, respectively. A pit (mark) train as shown in FIG. 8 is previously formed on the optical disk 1 according to the recording waveform of NRZI (Non Return to Zero Inverted) form (FIG. 8B) which is caused to correspond to the recording data (FIG. 8A) that is information to be recorded.

When the information recorded on the optical disk 1 is reproduced, a reproducing laser beam is irradiated onto the pit (mark) train of the optical disk 1 from the laser element 11 of the pickup 21 as a beam spot shown by slanted lines in FIG. 8C. With this operation, a reflected laser beam, in which a refection factor or the direction of polarized light in the beam spot is varied according to the presence or absence of pits, can be obtained. The reflected laser beam is received by the signal detection unit 22 shown in FIG. 5 and subjected to signal processing, thereby the information recorded on the optical disk 1 is read out. That is, a reproduced signal, which corresponds to the information recorded on the optical disk 1, can be obtained from the output that is obtained by subjecting the laser beam reflected from the optical disk 1 to a photoelectric conversion by the photo-detector 13 shown in FIG. 4.

The waveform (reproduced waveform) of the reproduced signal from the signal detection unit 22 (photo-detector 13) is not formed in a rectangular waveform as the recorded waveform explained before using FIG. 8B due to the characteristics of a recording/reproducing system and is formed in a dull waveform as shown in FIG. 8D.

The waveform (reproduced waveform) of the reproduced signal shown in FIG. 8D is subjected to the waveform equalization (processing) by the equalizer 53 so that the intersecting point of a threshold value (shown by a dot-dash-line in FIG. 8F) previously set to the waveform (reproduced waveform) of a reproduced signal, and an equalized signal is caused to coincide with (or to approximate to) the center of a window as shown in FIG. 8E. Specifically, the high frequency component of the reproduced signal is amplified.

The waveform (reproduced waveform) of the reproduced signal, which has been subjected to the equalization processing, is binarized as "1" when the intersecting point of the equalized waveform and the threshold value is detected by the level slice detector 54 in a window as shown in FIG. 8F and is binarized as "0" when the intersecting point is not detected therein.

Accordingly, a demodulated signal, which is obtained by demodulating the binary data obtained by the level slice detector 54, is output from the RLL demodulator 56.

As shown in FIG. 7, the PRML signal processing circuit 24 includes an AGC amplifier 61, an adder 62, an A/D converter 63, a linear equalizer (equalizer) 64, an ML decoder (Viterbi decoder) 65, an RLL demodulator 66, a PLL circuit 67, an AGC controller 68, an offset controller 69, and the like.

The level of the signal supplied from the signal detection unit 22 (output obtained by subjecting the light reflected from the optical disk 1 to photoelectric conversion) is corrected by the AGC amplifier 61 based on the control signal from the AGC controller 68 and supplied to the adder 62.

The signal whose gain has been controlled by the AGC amplifier 61 is added to the offset signal from the offset controller 69 by the adder 62 and supplied to the A/D converter 63.

The signal, to which the offset signal has been added by the adder 62, is converted into a digital signal by the A/D converter 63 by being converted into a discrete time and a discrete amplitude value series based on the channel clock from the PLL circuit 67 and supplied to the linear equalizer 64.

The digital signal output from the A/D converter 63 subjected to equalization processing by the linear equalizer 64, which includes an FIR filter (transversal filter) and the like, so that the waveform of the digital signal has PR(1,1) characteristics with respect to the waveform (reproduced waveform) of the reproduced signal, and the digital signal is supplied to the ML decoder 65, the PLL circuit 67, the AGC controller 68, and the offset controller 69.

The equalized waveform from the equalizer 64 is decoded by the ML decoder 65 and supplied to the RLL demodulator 66 as binary data. A Viterbi decoder, for example, can be used as the ML decoder 65.

The RLL demodulator 66 demodulates the decoded binary data output from the ML decoder 65 based on the RLL code.

The PLL circuit 67 creates the channel clock based on the equalized waveform output from the linear equalizer 64, and the channel clock is supplied to the A/D converter 63. That is, the PLL circuit 67 converts the difference between the amplitude value of a PR equalized waveform and the ideal amplitude value thereof into a difference of phase, thereby the channel clock is recovered (demodulated).

The AGC controller 68 sets the amount of correction (gain control level) in the AGC amplifier 61 based on the equalized waveform output from the equalizer 64.

The offset controller 69 sets an offset value to be supplied to the adder 62 based on the equalized waveform output from the equalizer 64.

Next, a signal processing system executed by the PRML signal processing circuit 24 will be explained using FIGS. 9A to 9G. FIG. 9A shows recording data, FIG. 9B shows a recording waveform, FIG. 9C shows the positional relationship between pits and a laser beam, FIG. 9D shows a reproduced waveform (which is an output from the signal detection unit 22), FIG. 9E shows the PR(1, 1) characteristics, FIG. 9F shows PR(1, 2, 1) characteristics, and FIG. 9G shows PR(1, 2, 2, 1) characteristics, respectively.

Figure 9:
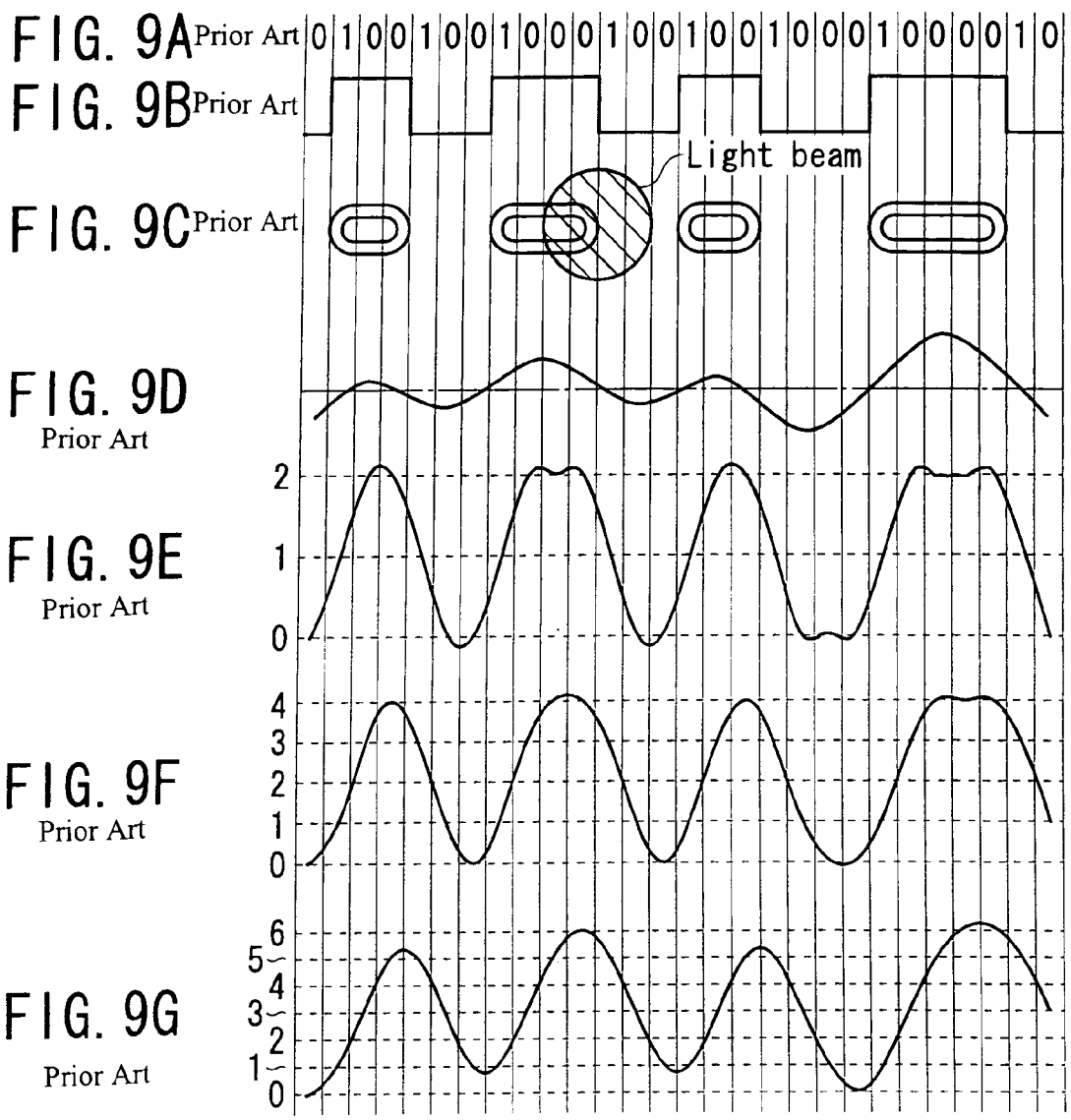
FIGS. 9A to 9G are schematic views showing the signal waveform and the data value of a main portion of the PRML signal processing circuit.

As shown in FIG. 9, a pit (mark) train is previously formed on the optical disk 1 according to the recording waveform NRZI form (FIG. 9B) which is caused to correspond to the recording data (FIG. 9A) that is information to be recorded.

When the information recorded on the optical disk 1 is reproduced, a reproducing laser beam is irradiated onto the pit train of the optical disk 1 from the laser element 11 of the pickup 21 as a beam spot shown by slanted lines in FIG. 9C. With this operation, a reflected laser beam, in which a refection factor or the direction of polarized light in the beam spot is varied according to the presence or absence of pits, can be obtained. The reflected laser beam is received by the signal detecting section 22 shown in FIG. 5 and subjected to signal processing, thereby the information recorded on the optical disk 1 is read out. That is, a reproduced signal, which corresponds to the information recorded on the optical disk 1, can be obtained from the output that is obtained by subjecting the laser beam reflected from the optical disk 1 to a photo-electric conversion by the photo-detector 13 shown in FIG. 4.

As shown in FIG. 9D, a reproduced waveform, which is a dull waveform as compared with the recording data (FIG. 9A) due to the characteristics of a recording/reproducing system, is equalized by the equalizer 64 explained before using FIG. 8 according to the PR(1, 1) characteristics, the PR(1, 2, 1) characteristics, and the PR(1, 2, 2, 1) characteristics, respectively.

PR(1,1) characteristic is a characteristic in which an impulse response appears at the rate of 1:1 at two successive identification points (that is, amplitude values of the reproduced waveform at two channel clock timings), respectively.

That is, the recording waveform of NRZI form of FIG. 9B corresponding to the first part "010010" of recording data of FIG. 9A is expressed as follows.

011100

Since the reproduced waveform is regarded as being an impulse response to "1" of the recording waveform, the waveform of FIG. 9E expressed as linear superposition of the following responses and obtained as "012210" becomes a target waveform to be equalized as the PR(1,1) characteristic (class).

0110

00110

000110

PR(1, 2, 1) characteristic is a characteristic in which an impulse response appears at the rate of 1:2:1 at three successive identification points (that is, amplitude values of the reproduced waveform at three channel clock timings), respectively.

Further, PR(1,2,2,1) characteristic is a characteristic in which an impulse response appears at the rate of 1:2:2:1 at four successive identification points (that is, amplitude values of the reproduced waveform at four channel clock timings), respectively.

That is, as in the case of the PR(1,1) characteristic, to-be-equalized target waveforms derived by linear superposition of impulse responses corresponding to the recording waveform become the waveforms as shown in FIGS. 9F and 9G (although not shown, this is also applied to other PR characteristics).

As apparent from FIGS. 9E, 9F, 9G, it is understood that the characteristic of the waveform after equalization gradually becomes a duller characteristic in the order of PR(1,1) characteristic, PR(1,2,1) characteristic and PR(1,2,2,1) characteristics.

As described above, in the PRML system, an increase in the signal degrading component in the equalizer 64 can be suppressed by equalizing the reproduced waveform, which is obtained by converting the laser beam reflected from the optical disk 1, into a waveform of a PR characteristic that is closer to the characteristics of of the reproduced waveform.

The equalized waveform from the equalizer 64 is decoded by the ML decoder 65 and supplied to the RLL demodulator 66 as the binary data.

If the reproduced waveform is equalized into a waveform of the PR($1,2,2,1$) characteristic by the equalizer 64, the ML decoder 65 selects a series having the smallest error with respect to the sample series of the equalized waveform from all of the reproduced waveform series which satisfy the PR($1,2,2,1$) characteristic and estimates and outputs recording data (binary data, decoded data) used as a source for generating the selected reproduced waveform series while tracing the state transition.

Figure 10:
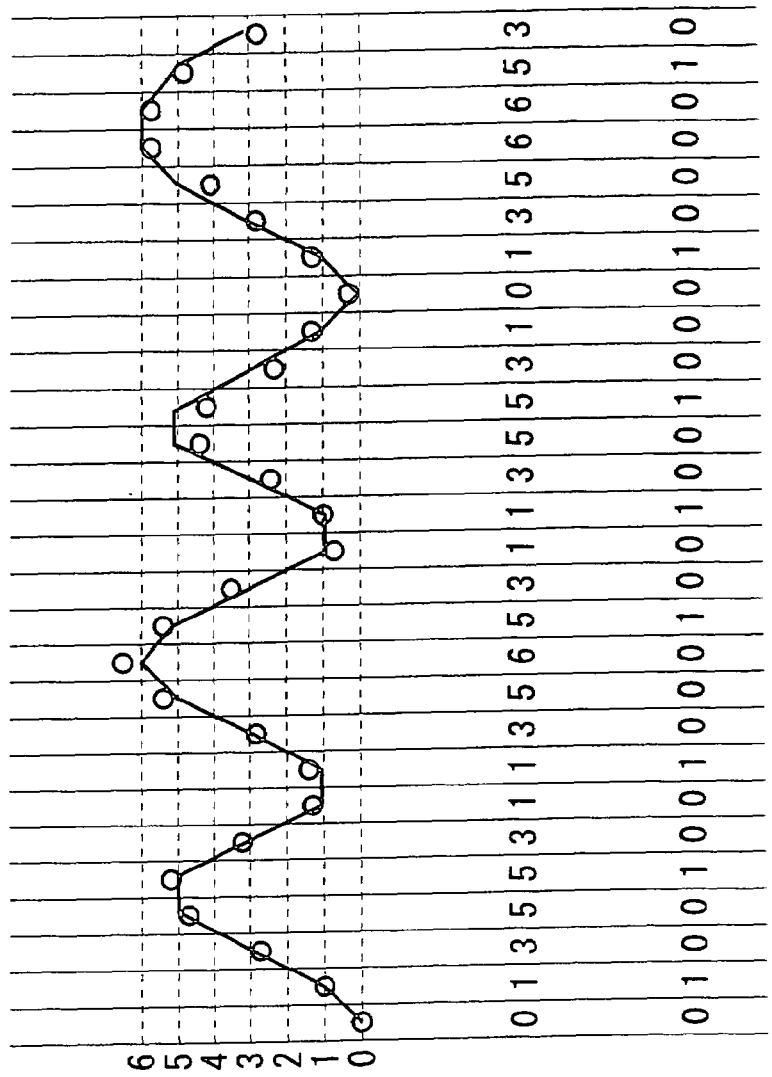
FIGS. 10A to 10C are schematic views explaining decode processing executed by an ML decoder.

FIGS. 10A to 10C are schematic views explaining an example of decoding executed by the ML decoder 65.

In the PRML system, the decoding process is not executed based on one sample value but executed based on a sequence using the correlation (waveform interference) due to the PR characteristic of a series of a plurality of sample values as a premise. Accordingly, the PRML system is highly resistant to the signal degrading component having no correlation between sample values.

That is, the decoded data as shown in FIG. 10C, i.e., the same data as that of FIG. 9A can be obtained by deriving "the signal level of the selected series" shown in FIG. 10B based on the correlation between "the sample series of the equilized signal" as shown in FIG. 10A and "the series selected by the ML decoder 65".

That is, as shown in FIGS. 10A to 10C, in a case where the signal waveform series obtained after PR($1,2,2,1$) equalization is given as follows.
01355311356531 . . .

impulse responses for a candidate of recorded data (01010 . . . ) (the recorded waveform is 01100 . . . ) are given as follows.
012210 . . .
001221 . . .

Then, the reproduced waveform of an ideal PR characteristic obtained by linear superposition of the above impulse responses is obtained as follows.
013431 . . .

Further, impulse responses for a candidate of another recorded data (01110 . . . ) (the recorded waveform is 01110 . . . ) are given as follows.
0122100 . . .
0012210 . . .
0001221 . . .

Then, the reproduced waveform of the ideal PR characteristic obtained by linear superposition of the above impulse responses is obtained as follows.
0135531 . . .

After this, the cross-correlations with respect to the waveform series of the above reproduced waveforms are calculated and a series having the highest correlation (=the smallest error between the series) with respect to the reproduced equalized waveform is selected by a probabilistic method.

Note that the number of candidates of the waveform can be increased and counted up as in a tree structure. However, the number of available states is limited when taking the PR characteristic into consideration. In the case of the PR($1,2,2,1$) characteristic, the constraint length (the range which the waveform interference gives an influence) is "4", and variations of recording data series caused by the waveform interference occur in 16 combinations of four-digit values constructed by two types of data values of "0" and "1", and therefore, the state number having no redundancy is 16 at maximum. There is a possibility that the state number will be reduced if the modulation code is limited.

The ML decoder 65 calculates the probability according to an input sample value when it is assumed that the state is transited from a certain state to a next state. When a plurality of candidates of the waveform series transited to the same state are provided, a probable one of the candidates is determined based on the accumulated value of the past transition probability.

For this purpose, the ML decoder 65 is provided with a path memory (which will be described later using FIGS. 30 to 34) that stores candidates of the waveform series. Generally, the length thereof is set to a length of several ten channel bits. A plurality of candidates of the waveform series are transited to the same state while they pass through the path memory, then the candidates are repeatedly selected and the most probable series is finally selected. Although not explained in detail, the ML decoder 65 includes a branch metric calculation unit, an ACS, which is the abbreviated name of an add-compare-select block circuit, and a path metric memory. The branch metric calculation unit calculates a logarithm value of the probability of transition of the state which is expressed in terms of a difference between actual amplitude and ideal amplitude obtained if it is assumed that the state is transited from a certain state to a next candidate state when a sample value is input, and the path metric memory is a memory for storing a past branch metric accumulated value obtained until the state transition for each of the states of the state number is repeatedly executed and the state is attained. Since it is well known that the most probable series is selected by the ML decoder, it is not explained here in detail.

Referring again to FIG. 7, the signal determination circuit 25 is used to switch between the slice system and the PRML system shown in FIG. 7.

When the linear superposition is established, the PRML system can reproduce a signal even if the shortest mark/pit has a small amplitude value. In contrast, in the level slice system, since the amplitude value of the shortest mark/pit is required to be larger than a certain level, this system is disadvantageous in a series is which a signal intensity is reduced. In the present invention, the conditions and the characteristics, which are preferable to reproduce a signal from the optical disk 1, are confirmed by the signal determination circuit 25 based on the signals that are obtained by processing a reproduced waveform by both the PRML system and the level slice system. Accordingly, the information recorded on the optical disk 1 is reproduced by the characteristics inherent to the optical disk 1 and the preferable reproducing conditions required to reproduce a signal.

The drive control circuit 26 can output a selection signal for switching whether a signal is to be reproduced by the PRML signal processing circuit 24 or by the level slice signal processing circuit 23 based on the output from the signal determination circuit 25, that is, based on the signal output from at least any one of the PRML signal processing circuit 24 and the level slice signal processing circuit 23.

For example, a changeover switch 59 of the level slice signal processing circuit 23 is turned on in response to the selection signal supplied thereto from the drive control circuit 26, thereby signal reproduction from the reproduced waveform, which is executed by the level slice signal processing circuit 23, is selected.

Further, a changeover switch 59 of the PRML signal processing circuit 24 is turned on in response to the selection signal supplied thereto from the drive control circuit 26, thereby signal reproduction from the reproduced waveform, which is executed by the level slice signal processing circuit 23, is selected.

The drive control circuit 26 outputs a predetermined control command to the servo controller 32 based on the address data that is related to the data obtained by the data instructed from the host apparatus interface 28 and the data obtained by the error correction unit 27. With this operation, the optical pickup 21 is moved to a predetermined position as well as the number of rotation of the spindle motor 33 is set to the number of rotation of a zone corresponding to an access position.

Next, recording of information on the optical disk 1 and reproduction of information from the optical disk 1, which are executed by the optical pickup described above with reference to FIG. 4, will be explained.

The laser beam emitted from the laser element 11 as a light source is guided to the objective lens 12 passing through the polarized beam splitter (PBS) 14 and the quarter-wave plate 15. The laser beam guided to the objective lens 12 is converged to a predetermined position of the optical disk 1, that is, to a predetermined depth of a track or a groove by a converging property given to the laser beam by the objective lens 12.

Note that the component, which is guided to the optical disk 1, of the laser beam emitted from the laser element 11, is an electric field component (P polarized light) whose polarizing surface is parallel with the incident surface of the PBS 14, and an electric field component (S polarized light) whose polarizing surface is vertical to the incident surface is reflected by the reflection PBS.

The quarter-wave plate 15 is a sheet-like member formed by cutting an optical crystal having a predetermined double refraction value to a predetermined thickness corresponding to the wavelength of a laser beam and converts the linear polarized light of P polarized light, which has been emitted from the laser element 11 and passed through the PBS 14, into circular polarized light and converts the circular polarized light of the laser beam reflected by the optical disk 1 into linear polarized light. That is, when the direction of the polarized light of the laser beam emitted from the laser element 11 is set as an x-direction and the PBS 14 is disposed so as to cause a polarized light component in the x-direction to pass therethrough and to reflect the polarized light component in a y-direction perpendicular to the x-direction, the laser beam from emitted the laser element 11 passes through the PBS 14 as it is and is incident on the objective lens 12 after the direction of the polarized light surface thereof converted into circular polarized light by the quarter-wave plate 15. In contrast, the reflected laser beam, which has been reflected by the optical disk 1 and returned to the objective lens 12 and the direction of the polarized light of which is the circular polarized light, is caused to pass through the quarter-wave plate 15 again, thereby the reflected laser beam is made to linear polarized light the direction of the polarized light is directed to the y-axis direction.

Accordingly, the reflected laser beam from the optical disk 1, which has been returned to the PBS 14, is reflected to the photo-detector 13 by the PBS 14, subjected to photoelectric conversion by the photo-detector 13 and used to output a reproduced waveform for obtaining a reproduced signal.

The change of signal intensity when double refraction exists in the optical disk 1 will be explained.

When the magnitude of phase retardation caused in the y-direction by the double refraction is shown by $\gamma$ at the time the laser beam, the direction of the polarized light of which has been made to the circular polarized light by the quarter-wave plate 15, is reflected by the optical disk 1, the intensity of the laser beam, which returns to the laser element 11, of the reflected laser beam is $\sin^2(\gamma/2)$ times compared with the intensity of the laser beam directed from the laser element 11 to the optical disk 1. Accordingly, the intensity of the laser beam reflected toward the photo-detector 13 by the PBS 14 is $\cos^2(\gamma/2)$ times. That is, if the phase retardation $\gamma$ due to the double refraction is "0", the reflected laser beam is entirely incident on the photo-detector 13, whereas when the phase retardation $\gamma$ is large, the intensity of the laser beam incident on the photo-detector 13 is reduced by $1-\sin^2(\gamma/2)$. Since the laser beam returned to the laser element 11 also acts as a factor for increasing the noise of the laser beam, it must be suppressed as small as possible.

More specifically, when the intensity of the laser beam emitted from the laser element 11 is shown by "a", the laser beam Ein, which is emitted from the laser element 11 and incident on the PBS 14, is represented by Expression (1) shown below.

$$Ein = \begin{pmatrix} Ex \\ Ey \end{pmatrix} = a \begin{pmatrix} \cos wt \\ 0 \end{pmatrix} \quad (1)$$

When the quarter-wave plate 15 is disposed in a tilt state so that the laser beam incident thereon has an azimuth of 45°, the laser beam Ein is represented by Expression (2) shown below.

$$Ein = \begin{pmatrix} \cos 45 & \sin 45 \\ -\sin 45 & \cos 45 \end{pmatrix} \cdot \begin{pmatrix} Ex \\ Ey \end{pmatrix} = \frac{a}{\sqrt{2}} \begin{pmatrix} \cos wt \\ -\cos wt \end{pmatrix} \quad (2)$$

Since the phase of the y-directional component of the laser beam $Eout_1$, which has passed through the quarter-wave plate 15, is retarded by $\pi/2$, the laser beam $Eout_1$ is represented by Expression (3) shown below.

$$Eout1 = \frac{a}{\sqrt{2}} \begin{pmatrix} \cos wt \\ -\cos(wt - \frac{\pi}{2}) \end{pmatrix} = \frac{a}{\sqrt{2}} \begin{pmatrix} \cos wt \\ -\sin wt \end{pmatrix} \quad (3)$$

When Expression (3) is shown on a coordinate x-y, the laser beam $Eout_1$ described above is represented by Expression (4) shown below.

$$Eout1 = \begin{pmatrix} Ex \\ Ey \end{pmatrix} = \frac{a}{\sqrt{2}} \begin{pmatrix} \cos(wt - \frac{\pi}{3}) \\ \cos(wt + \frac{\pi}{4}) \end{pmatrix} \quad (4)$$

When the phase retardation y occurs in the y-direction in the reflected laser beam Eref, which has been irradiated to the pit (mark) train, the groove, or the land of the optical disk 1 in this state and reflected from the optical disk 1, the reflected laser beam Eref is represented by Expression (5) shown below.

$$Ereg = \begin{pmatrix} Ex \\ Ey \end{pmatrix} = \frac{a}{\sqrt{2}} \begin{pmatrix} \cos(wt - \frac{\pi}{4}) \\ \cos(wt + \frac{\pi}{4} - \gamma) \end{pmatrix} \quad (5)$$

When Expression (5) is shown on the coordinate x-y, the laser beam Eref described above is represented by Expression (6) shown below.

$$Ereg = \begin{pmatrix} Ex \\ Ey \end{pmatrix} = a \begin{pmatrix} \cos(wt - \frac{\gamma}{2})\cos(\frac{\pi}{4} - \frac{\gamma}{2}) \\ -\sin(wt - \frac{\gamma}{2})\sin(\frac{\pi}{4} - \frac{\gamma}{2}) \end{pmatrix} \quad (6)$$

When the reflected laser beam Eref is caused to pass through the quarter-wave plate 15 once more, it becomes a reflected laser beam Eout$_2$ the phase of the y-directional component of which has been retarded by $\pi/2$, and the reflected laser beam Eout$_2$ is represented by Expression (7) shown below.

$$Eout2 = a \begin{pmatrix} \cos\frac{\gamma}{2} \\ \sin\frac{\gamma}{2} \end{pmatrix} \cos(wt - \frac{\gamma}{2}) \quad (7)$$

Accordingly, the intensity Iout of the reflected laser beam Eref (Eout$_2$), which has been caused to pass through the quarter-wave plate 15 twice, is represented by Expression (8) shown below.

$$Iout = \begin{pmatrix} Ix \\ Iy \end{pmatrix} = a^2 \begin{pmatrix} \sin^2\frac{\gamma}{2} \\ \cos\frac{\gamma}{2} \end{pmatrix} \quad (8)$$

That is, the intensity Ix of the return laser beam, which has passed through the reflected laser beam PBS 14 and has been returned to the laser element 11, of the laser beam Eout$_2$ that had been returned to the PBS 14, is represented by Equation (9) shown below, and the intensity Iy of the reflected laser beam, which has been reflected-by the PBS 14 and directed to the photo-detector 13, is represented by Equation (10) shown below, respectively.

$$Ix = a^2\sin^2(\Delta\gamma/2) \quad (9)$$

$$Iy = a^2\cos^2(\Delta\gamma/2) \quad (10)$$

When the phase retardation $\gamma$ is caused by the effect of the double refraction $\Delta$, the intensity of the reflected laser beam incident on the photo-detector 13 is $\cos^2(\gamma/2)$ times that of the intensity of the laser beam directed from the laser element 11 to the optical disk 1.

Incidentally, in the DVD discs used at preset, the following upper limit is set as the magnitude of the double refraction $\Delta$ when it is measured using a double pass to suppress the reduction of intensity of the signal detected by the photo-detector 13.

The upper limit is set, for example, to:

100 nm in a read-only disk (hereinafter, abbreviated as DVD-ROM) of DVD standard (Standard ECMA-267, p15);

100 nm in a DVD-R on which information can be recorded only once (Standard ECMA-279, p16); and 60 nm in a DVD-RAM on which information can rewritten (Standard ECMA-272, p13).

Further, as to a method of measuring the double refraction $\Delta$, Standard ECMA-267 shows "to measure the double refraction by irradiating a laser beam having a wavelength of 640±15 nm at an angle 7° with respect to the direction vertical to a disk" on pages 41 and 42.

Note that the magnitude of the phase retardation $\gamma$ due to the effect of the double refraction $\Delta$ can be determined from the double refraction $\Delta$ by "$\gamma=\Delta/\lambda\times360°$, where $\lambda$: laser wavelength".

Accordingly, in the DVD disk, the relationship between the double refraction $\Delta$ and the intensity of the laser beam incident on the photo-detector 13 is represented by Table 1 shown below.

TABLE 1

| Double refraction (nm) | Signal intensity (%) |
|---|---|
| 0 | 100.0 |
| 10 | 99.8 |
| 20 | 99.1 |
| 30 | 97.9 |
| 40 | 96.3 |
| 50 | 94.3 |
| 60 | 91.8 |
| 70 | 89.0 |
| 80 | 85.8 |
| 90 | 82.3 |
| 100 | 78.4 |

When Table 1 and the regulation of the double refraction $\Delta$ are brought into check, a reduction in signal intensity up to 78.4% is allowed in the DVD-ROM and the DVD-R, and a reduction in signal intensity up to 91.8% is allowed in the DVD-RAM. Since DVD-RAM disk inherently has a low reflection coefficient and further may deteriorate a signal through rewriting, it requires signal intensity larger than that of the DVD-ROM and DVD-R discs, so that the specification of the DVD-RAM disk is strictly determined.

Incidentally, in a system in which a signal amplitude (signal intensity) decreases, a signal is generally amplified by an amplifier. However, it is needless to say that simply amplifying the signal is not effective because a noise component is increased at the same time and a C/N (S/N) ratio remains unchanged.

Further, as finer information is desired as an image source, it is required to increase a recording capacity using the PRML signal processing described above. That is, in the widely used level slice signal processing system, when the size of a pit (mark) is simply reduced, data cannot be determined only by one bit because a reproduced waveform is subjected to waveform interference from an adjacent bit.

However, since the waveform interference also exists even in the PRML signal processing system, a reproduced waveform can be detected at a higher error rate using a ML detector that selects the most reliable sequence from the sequences that takes the front and the back of a waveform into consideration.

It should be noted that, in a conventional level slice equalizer, binary data is determined based on the position of the intersecting point of a threshold value set to a reproduced waveform and an equalized waveform, the intersecting point being detected by being subjected to equalization processing to dispose the interesting point at the center of window, decoded data is obtained by subjecting the binary data, which has been obtained by detecting the intersecting point, to NRZI (Non Return to Zero Inverted) conversion (data recorded on an optical disk is decoded).

Incidentally, the intersecting point of the equalized waveform and the threshold value is not always the center of a window because of noise and the like. Thus, the standard deviation of the data at the intersecting point is called a jitter when it is standardized using a window width, and the jitter is used as an evaluation reference of optical discs and optical disk drives.

Next, there will be examined a case that information is reproduced from an optical disk on which information is recorded at a density higher than that of a DVD used at present invention using an optical head (optical pickup) designed to a DVD standard disk used at present.

A higher track density causes a reproduced signal to include a larger amount of a signal deteriorating component called a crosstalk component. In contrast, a higher line density results in a duller reproduced waveform.

Since the high frequency component of the reproduced signal is amplified by the equalizer as described above, when an input reproduced waveform is a duller reproduced waveform, the high frequency component must be more amplified. As a result, it is apparent that the signal deteriorating component described above is also amplified by the equalizer.

Incidentally, as described above, the signal intensity is reduced up to 78.4% in the DVD-ROM and the DVD-R and up to 91.8% in the DVD-RAM by the effect of the double refraction Δ described before using Table 1.

When the effect of the double refraction Δ is applied to an optical disk and a recording/reproducing system that use a laser beam having a wavelength of 405 nm, even if the reduction in signal intensity as large as that of the DVD discs is allowed, the allowable magnitude of the double refraction Δ is greatly reduced as shown in Table 2.

TABLE 2

| Double refraction (nm) | Signal intensity (%) |
|---|---|
| 0 | 100.0 |
| 10 | 99.4 |
| 20 | 97.6 |
| 30 | 94.7 |
| 40 | 90.7 |
| 50 | 85.7 |
| 60 | 79.9 |
| 70 | 73.3 |
| 80 | 66.2 |
| 85 | 62.5 |
| 90 | 58.7 |
| 100 | 51.0 |

When the standard value (100 nm) of the double refraction of the DVD-ROM and the DVD-R is applied as it is from Table 2, the signal intensity is halved in the DVD-ROM and the DVD-R and reduced to about 80% in the DVD-RAM in which the standard value of the double refraction is 60 nm. Accordingly, a problem arises in that when information is recorded and reproduced, an error tends to occur and the information cannot be accurately recorded and reproduced.

In particular, in RLL modulation, which is examined in the optical disk and the recording/reproducing system that use the laser beam having the wavelength of 405 nm, since a shortest mark is a 2T signal (a recording system in which the number of "0" that is permitted to exist between numerals "1" which show the leading and trailing ends of a pit (mark) train is 1), the minimum value of the signal intensity is more reduced.

In consideration of the above problem, the present invention will examine two systems described below.

A first point is a case of using the waveform slice system, which is utilized at present, as a signal processing system when a signal is recorded on and reproduced from an optical disk of the DVD standard. In this case, the limit value of the double refraction can be examined by the same concept as that used in the optical disk of the DVD standard.

When the values of the double refraction Δ, which satisfy the allowable ranges of the signal intensity of the DVD standard optical discs determined from Table 1 (the signal intensity of DVD-ROM and DVD-R: 78.4 or more, and the signal intensity of DVD-RAM: 91.8% or more) also in a system using the laser beam having the wavelength of 405 nm, are determined from Table 2 the value of the double refraction Δ is 60 nm or less in a ROM (reproduction-only) disk and an R (recordable only once) disk and 40 nm or less in a RAM (recordable and erasable) disk (hereinafter, referred to as a recording/reproducing optical disk).

That is, when the magnitude of the double refraction Δ is 60 nm or less in the ROM (reproduction only) disk and the R (recordable only once) and 40 nm or less in the RAM (recording/reproducing), information can be stably recorded and reproduced even by an optical disk apparatus using the laser beam having the waveform of 405 nm.

A second point is a case of using the PRML system that is effective as a reproduced signal processing system when the S/N (signal to noise ratio) of a reproduced signal is lowered.

In the PRML system, the level of the reproduced signal can be increased by about 2 dB in terms of the S/N ratio by the effect of the ML determination circuit explained before using particularly FIGS. 6, 7, and 9. This means that a reproduced signal of the same level can be obtained by signal intensity of about 80% as compared with a case that ML is not determined when it is examined in terms of a signal amplitude.

That is, using the PRML system permits information to be stable recorded and reproduced when a signal amplitude is 80% of that in the waveform slice system. When the PRML system is used, if a signal amplitude of 90% of that in the waveform slice system is obtained, the information can be stably recorded and reproduced.

Accordingly, when the PRML system is used, signal intensity (62.7% or more in ROM and R discs and 73.4% or more in a RAM disk) that is 80% of the allowable ranges of the signal intensity in the DVD standard optical discs that can be determined from Table 1 (78.4 or more in DVD-ROM and DVD-R, and 91.8% or more in DVD-RAM) is the lower limit value of the signal intensity required to reproduce a signal.

From the above-mentioned, when the value of the double refraction, which can secure the signal intensity acting as the lower limit value of the DVD standard optical discs is determined using Table 2, the value is 85 nm or less in the ROM and R discs and 70 nm or less in the R disk.

Likewise, when the value of the double refraction, which can secure the signal intensity (70.6 or more in DVD-ROM and DVD-R, and 82.6% or more in DVD-RAM) which is 90% of that in the allowable range of the signal intensity in the DVD standard optical discs as the level of the value of the double refraction that can preferably secure the signal intensity, the value is 75 nm or less in the ROM and R discs and 55 nm or less in the RAM disk.

As described above, when the PRML system is used in the signal processing, even if the signal intensity is lowered by the effect of the double refraction described above in an optical disk, which can record and reproduce information by the laser beam having the wavelength of 405 nm, and in an optical disk apparatus, which can record and reproduce information on and from an optical disk, the information can be securely recorded and reproduced.

Next, the optical disk, which is formed by the processes described above with reference to FIGS. 1A to 1E and FIGS. 2A to 2C, will be explained in detail using FIG. 3.

The optical disk 1 is made by forming a metal film or a dye film (a reflection film in an reproduction-only disk, an organic recording layer in an only-once-recordable disk, and a phase varying recording film in a rewritable disk) 2 on the molded substrate 1a made in the molding processes of FIG. 1, and then another molded substrate (or dummy substrate) 1b is bonded on the molded substrate 1a using ultraviolet curing resin that is not described in detail. A hard coat layer, which is not described in detail, is formed on the laser beam incident surface of the molded substrate 1a to protect the disk from scratch and dirt. When the recording layer 2, which is the metal film or the dye film, is applied to the reproduction-only (ROM) disk, the recording layer 2 is formed in the thickness of about 100 nm by sputtering or vacuum depositing a metal such as Al, Ag, etc. When the recording layer 2 is the organic recording layer used in the only-once-recordable disk, a dye material, which can securely absorb the 405 nm laser beam, is coated in the thickness of 100 nm by, for example, spin coating. When the recording layer 2 is the phase varying recording film, which is used in the recording/reproducing disk, a film of a predetermined metal or alloy is formed by sputtering and the like.

The ultraviolet ray curing resin 3 is coated on at least one resin molded sheet (substrate 1a or 1b) in a state that it is placed on a spinner (that is not described in detail). Then, after the confronting substrate is set to the resin molded sheet, the resin molded sheet is left in vacuum to remove the bubbles contained in the ultraviolet ray curing resin 3. Subsequently, after the ultraviolet ray curing resin 3 is pressed with a predetermined pressure, it is irradiated with ultraviolet rays and cured.

Resin having viscosity of about 400 cps can be used as the ultraviolet ray curing resin, and a resin SD649 manufactured by Dainippon Ink and Chemicals, Incorporated, for example, is used in this embodiment.

The number of rotation of the spinner is set to 60 RPM when the ultraviolet ray curing resin is dropped and to 8000 RPM when the resin is splashed, thereby an about 25 μm thick resin layer is obtained.

In contrast, the resin molded sheet (the substrate 1a or 1b or the dummy substrate) is injection molded by, for example, a DVD injection molding machine (IS40HD) manufactured by Toshiba Machine Co., Ltd. A plycarbonate resin (AD-5503) manufactured by Teijin Chemicals Ltd., for example, can be used as a substrate material.

As described above, the size of the pit (mark), which can reproduce information by the laser beam having the wavelength of 405 nm is small as compared with the size of the DVD standard disk, and a track pitch is narrow likewise in the only-once-recordable disk, which can record information by the laser beam having the above wavelength, and in the recording/reproducing disk.

Accordingly, it is difficult to securely transfer patterns formed on a stamper as well as to suppress the magnitude of the double refraction when the substrate is molded. In particular, in the write-once type disk on which the dye layer is coated, it is required to most increase a transfer property because grooves are filled with dye.

Although the characteristics of the molded substrate depend on many parameters represented an injection pressure, a mold clamping pressure, a stroke time, a timing at which molds are clamped, a metal mold temperature and the like, attention is mainly paid to the metal mold temperature in this embodiment.

The glass transition temperature of the polycarbonate resin as the substrate material is about 150° and an increase in the metal mold temperature is limited. However, there is a tendency that the magnitude of the double refraction is suppressed by increasing the metal mold temperature. Therefore, in this embodiment, a plurality of types of optical discs are formed by changing the metal mold temperature and evaluated by the method described below, and an optimum condition is determined by the result of evaluation.

The characteristics of the optical discs used as samples are as described below.

After a base plate was made as a ROM (reproduction-only) disk by a base plate exposing machine that uses a Kr laser beam having a wavelength of 351 nm, a Ni-plated stamper, on which transfer data having a shortest mark length of 0.205 μm, a track pitch of 0.40 μm, and a pit depth of 70 nm was recorded by cutting was used.

At the time, five kinds of molded substrates each having different double refraction, that is, samples A, B, C, D, E were prepared.

Each of the substrates was formed to have an inside diameter of 15 mm, an outside diameter of 60 mm, and a thickness of 0.60 mm. An Al film of 100 nm thick was formed on the molded substrate by a sputtering device, and the substrate was bonded to another molded substrate through ultraviolet ray curing resin.

The double refraction of these samples was measured at a position having a radius of 40 mm.

The double refraction was measured by a double refraction measuring device, which was made by Admon Science, Inc. and employed a laser element capable of outputting a blue laser beam (wavelength: 400 nm) as a light source. The double refraction measuring device could accurately measure the change of phase of the laser beam reflected on the recording surface of a disk.

To evaluate the double refraction, the laser beam was incident on the disk at an angle tilted 7° from a direction vertical to the disk based on the regulation of Standard ECMA-267, p 41-42.

It is possible to measure the double refraction by a single pass by causing the laser beam to pass through a single molded plate (one substrate). However, when an optical disk is made by bonding two substrates, the value of the double refraction measured in the single plate is varied by the effect of stress and distortion in the substrates. Thus, it is preferable to measure the double refraction by a double pass using the laser beam reflected from the disk composed of actually bonded substrates.

The numerical aperture NA of an objective lens of an optical pickup was set to 0.65, and the signal characteristics of the laser beam reflected from the optical disk were evaluated by a laser beam having a wavelength of 405 nm. Further, to evaluate the signal characteristics, an error rate was evaluated as signal processing unique to the applicant. Although the RLL modulation was used as a data modulation system in the present invention, it is needless to say that the same effect could be obtained by another modulation system.

An evaluation condition, the sample disk was turned so that a pit (mark) train was moved at a line speed of 6.6 m/sec and the read power of the laser beam was set to 0.5 mW, and a reflected laser beam was obtained from precut data by setting the read power of the light beam to 0.5 mW.

The double refraction was measured by a method of measuring the level of an RF signal on the high reflection ratio side thereof as Rtop and determining the error rate of decoded data by the signal processing circuit 25 explained before with reference to FIG. 6. At the time, the error rate was determined by being measured by the level slice system and the PRML system which were arbitrarily switched by the signal determination circuit 25.

The magnitude of the double refraction determined based on the reflected laser beam obtained by turning the sample disk was used as the average value of the double refraction in the one round of the disk.

Table 3 shows a result of evaluation obtained by capturing the laser beams reflected from the sample discs A to E described above to a signal evaluation device. In Table 3, Rtop shows a value standardized using the value of the sample A (double refraction A is generally "0") as a reference. Further, as to the error rate, a threshold value in which a signal can be stably reproduced is set to $1\times10^{-4}$, and an error rate equal to or less than the threshold value is shown by ○ and an error rate exceeding the threshold value is shown by X.

TABLE 3

|  | Double refraction (nm) | Rtop (standardization) | Level slice | PRML |
|---|---|---|---|---|
| Sample A | −3 | 1.00 | ○ | ○ |
| Sample B | −35 | 0.94 | ○ | ○ |
| Sample C | −60 | 0.78 | ○ | ○ |
| Sample D | −81 | 0.61 | X | ○ |
| Sample E | −105 | 0.45 | X | X |

As apparent from Table 3, an increase in the magnitude of the double refraction decreases the magnitude of Rtop. However, it can be admitted that a signal can be reproduced in an appropriate range of the error rate in the samples A to C in the level slice system and in the samples A to D in the PRML system. It can be found that even if signal intensity decreases, a margin is increased by employing the PRML system.

Table 4 relates to a recording/reproducing disk on which information can be rewritten. Five kinds of samples whose injection condition was changed similarly to the ROM disk described above were prepared, and Table 4 shows a result of evaluation of the effect of double refraction to these samples. A base plate and a stamper were made similarly to those of the ROM disk, a groove (land) pitch was set to 0.68 μm, and data was recorded in grooves and lands (a track pitch was set to 34 μm. Further, the grooves were composed of a continuous spiral groove directed from the inner radius of the disk to the outer radius thereof.

Figure 11:
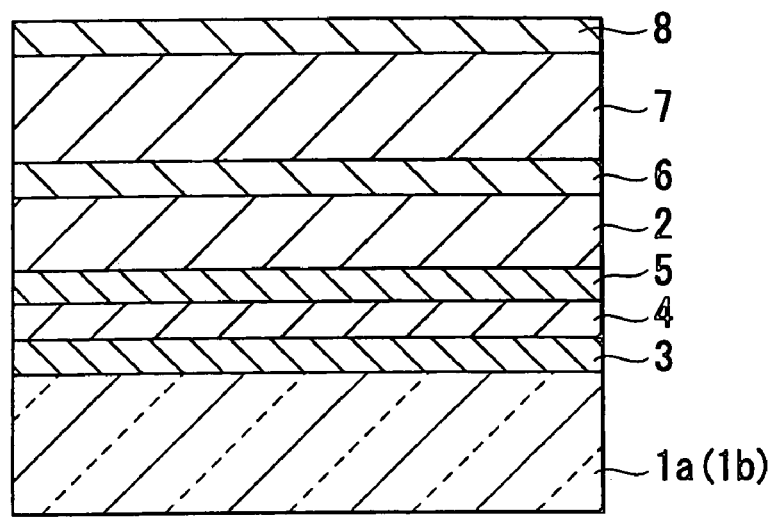
FIG. 11 is a view showing an example of the arrangement of the recording film of a recording optical disk.

FIG. 11 shows an example of a multi-layer recording film common to the five kinds of the sample discs shown in Table 4.

As shown in FIG. 11, the RAM (recording/reproducing) disk includes a first dielectric layer ($ZnSSiO_2$, i.e. protection film) 3, a second dielectric layer ($SiO_2$) 4, a third dielectric layer ($ZnSSiO_2$, i.e. protection film) 5, a recording layer (GeSbTeBi, i.e. multi-layer film) 2, a fourth dielectric layer ($ZnSSiO_2$ film, i.e. heat absorption layer=protection layer) 6, a reflection layer (AgNdCu) 7, a hard coat layer (ultraviolet ray curing resin) 8, and the like which are formed sequentially from, for example, the molded substrate 1*a* (or 1*b*). The layers from the first dielectric layer 3 to the refection layer 7 are formed by sputtering.

The first dielectric layer 3 has a thickness of 30 nm, the second dielectric layer 4 has a thickness of 60 nm, the third dielectric layer has a thickness of 35 nm, the recording layer 2 has a thickness of 15 nm, the fourth dielectric layer 6 has a thickness of 30 nm, and the reflection layer has a thickness of 100 nm.

As the evaluation condition of the RAM disk, the effect of double refraction on a reflected laser beam, which was obtained when data was recorded first and then the recorded data was reproduced, was evaluated. The recorded data was random data subjected to the RLL modulation.

Figure 12:
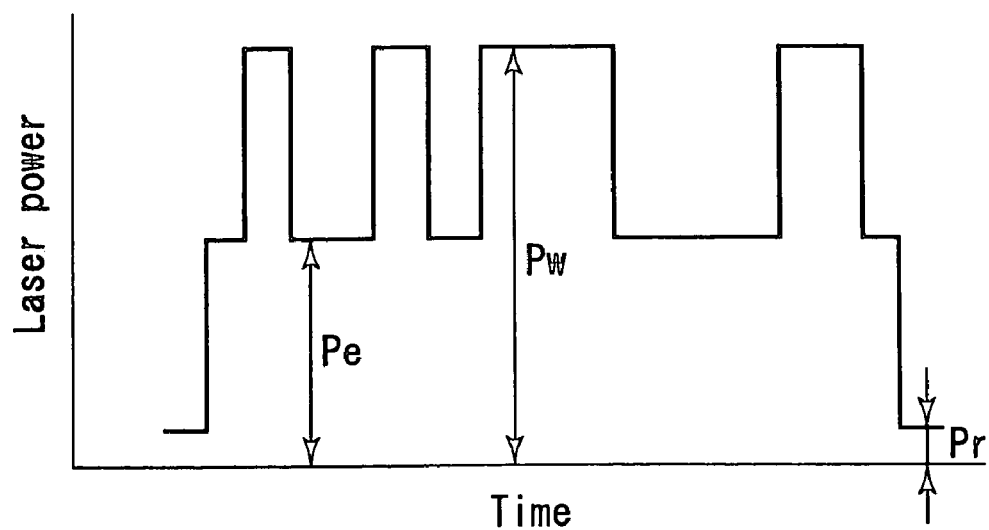
FIG. 12 is a view showing a laser waveform modulated for recording.

A laser waveform modulated for recording as shown in FIG. 12 was used to record the data. In FIG. 12, Pw denotes a write power, Pe denotes an erase power, and Pr denotes a reproduction power, respectively. Further, data could be overwritten by optimizing the respective powers. As an example, the respective powers were set to Pw=5.2 mW, Pe=2.4 mW, and Pr=0.5 mW. Further, a line speed was set to 5.6 m/sec, and a channel frequency was set to 64.8 MHz in recording.

Under the above conditions, information was recorded in five tracks in total about lands, and the data recorded in a central land was reproduced. That is, the leakage of data of an adjacent track due to the occurrence of crosstalk, cross erase due to the effect of the laser beam irradiated when data was recorded in the adjacent track, and the like were also reproduced.

TABLE 4

|  | Double refraction (nm) | Rtop (standardization) | Level slice | PRML |
|---|---|---|---|---|
| Sample A | −2 | 1.00 | ○ | ○ |
| Sample B | −22 | 0.98 | ○ | ○ |
| Sample C | −38 | 0.92 | ○ | ○ |
| Sample D | −65 | 0.75 | X | ○ |
| Sample E | −88 | 0.60 | X | X |

In Table 4, Rtop shows a value that is standardized using the value of the sample A (double refraction Δ is generally "0") as a reference. Further, as to the error rate, a threshold value in which a signal can be stably reproduced is set to $1\times10^{-4}$, and an error rate equal to or less than the threshold value is shown by ○ and an error rate exceeding the threshold value is shown by X. The system explained before with reference to FIG. 6 is used as the signal processing circuit.

As apparent from Table 4, although an increase in the magnitude of the double refraction (of the samples) decreases Rtop, a signal can be reproduced in an appropriate range of the error rate in the samples A to C in the level slice system and in the samples A to D in the PRML system. Further, it can be admitted that a margin is increased with respect to a decrease in the signal intensity by employing the PRML system.

Although a detailed result of evaluation is not shown as to a only-once readable disk, a base plate and a stamper each having a track pitch of 0.40 μm and a groove depth of 100 nm were formed by manufacturing processes similar to those of the recording/reproducing disk explained before. Then, samples each of which was composed of two substrates having a dye film formed thereon were prepared, and the signal intensity of a reflected laser beam was evaluated in the respective sample discs similar to the ROM and RAM discs.

Since grooves were formed deeper than those in the ROM and RAM discs in consideration of that they might be filled with the dye film, a molding condition was changed to a condition under which patterns cut on the stamper could be more accurately transferred.

In this case, although a degree of curling occurring in a single substrate was increased, the degree of curling fell within a standard by optimizing a bonding condition.

Cyanine dye was coated by a spinner in the thickness of about 200 nm as the dye film, and an Ag film was formed in the thickness of about 100 nm by sputtering as a reflection film. Since the magnitude of the double refraction of the samples was larger than that of the RAM discs, the samples, which had the distribution of the double refraction similar to that of the ROM discs described above using Table 3 could be obtained.

When the samples were evaluated similarly to the RAM discs under the evaluation conditions in which a line speed was set to 6.6 m/sec, a channel frequency was set to 64.8 MHz in recording, a signal could be reproduced at an appropriate error rate in the samples whose magnitude of double refraction was about 60 nm or less in the level slice system and in the samples whose magnitude of double refraction was about 85 nm or less in the PRML system.

Incidentally, in an optical disk, from which information can be reproduced by a laser beam having a wavelength of 405 nm and on which information can be recorded by the laser beam having the same wavelength, and in an optical disk apparatus which records information on the optical disk and reproduces information from the optical disk, inherent information is previously recorded on the optical disk itself. Further, the optical disk apparatus can optimize a recording condition and a reproducing condition by reproducing the information recorded on the optical disk.

Examples of the features of the information recorded on the optical disk and the optical disk apparatus that can reproduce the information recorded on the optical disk will be sequentially explained.

The optical disk 1 has a data arrangement structure that is common to each of 1) a ROM (reproduction-only) disk, 2) a write-once type (R) disk on which information can be recorded only once, and 3) a RAM (recording/reproducing type, i.e. rewritable type) disk. That is, this embodiment places greater emphasis on the securement of compatibility among information recording mediums (optical discs 1) that are classified into a reproduction-only type, a write-once type, and a rewritable type, and the information recording mediums have a common structure in the respective types described above in the following points shown in FIG. 13:

(a) the information recording mediums have a lead-in area, a data area, and a data lead-out area that are arranged commonly;

(b) the lead-in area is commonly divided into a system lead-in area and a data lead-in area across a connection area;

(c) any of the reproduction-only type, the write-once type, and the rewritable type permits a single-layer structure (single light reflection layer or a single recording layer) and two-layer structure (two light reflection layers or two recording layers exist so that information can be reproduced from one surface); and (d) the information recording mediums have the same overall thickness, inside diameter, and outside diameter.

Figure 14A:
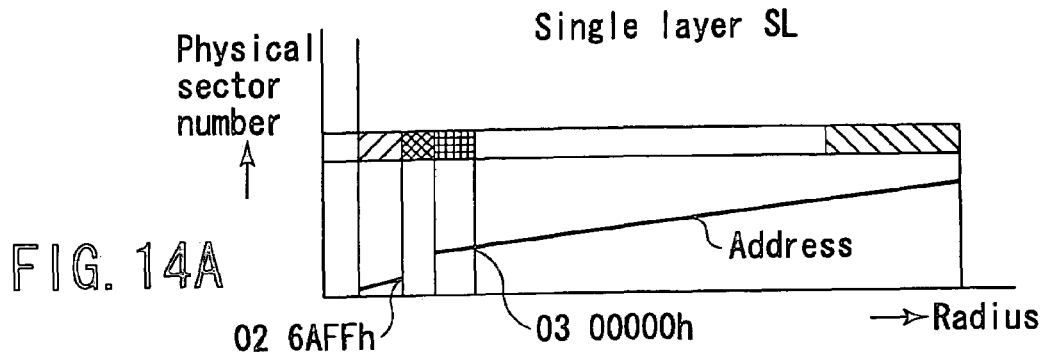
FIGS. 14A to 14C are schematic views explaining the arrangements and the data structures of the lead-in area, the data area, and the data lead-out area of a two-layer reproduction-only disk.
Figure 14B:
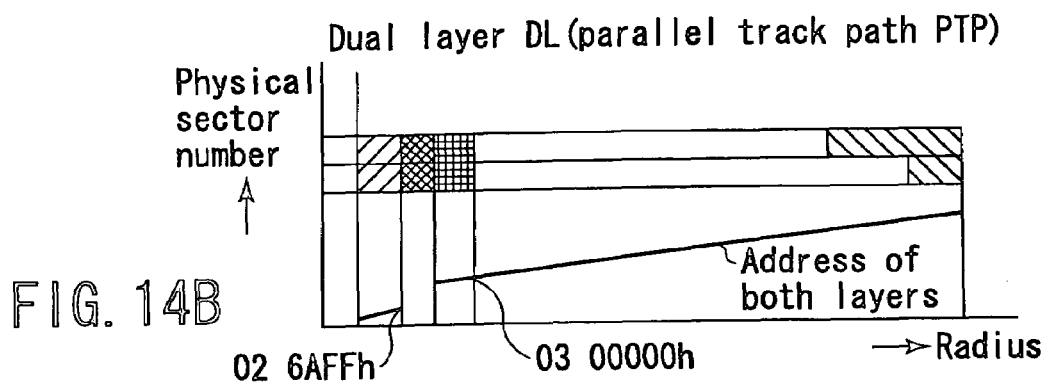
Figure 14C:
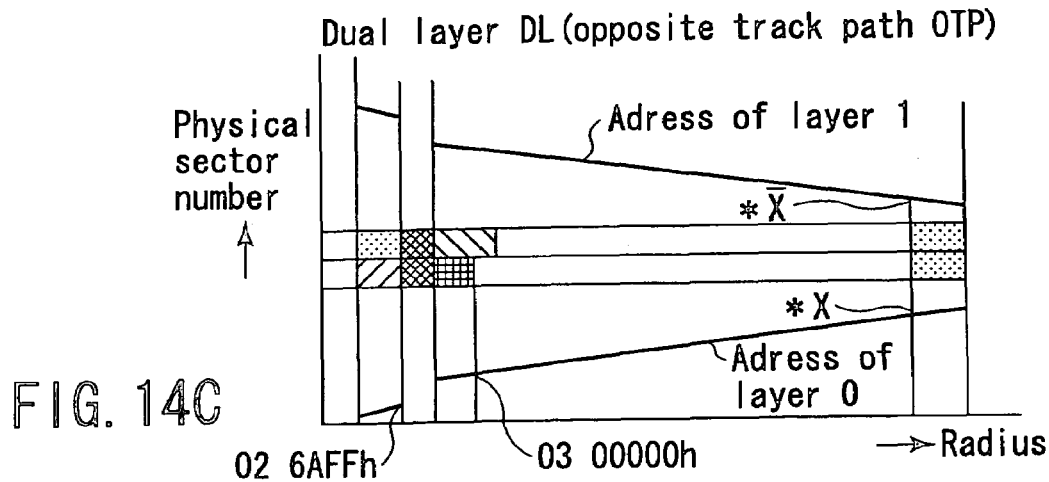

As shown in FIG. 14, the system lead-in areas are formed only in two reproduction-only layers (opposite track paths). Note that the arrangement of the data area of a disk including the lead-in areas is as shown in, for example, FIG. 15.

In the above items (a) to (d), the items (a) and (d) are also applied to the known DVD standard optical disk likewise. In this embodiment, the feature of the item (b) will be particularly explained.

The information area in the disk is divided into the following five sections according to the mode of the disk. That is, the disk has the system lead-in area, the connection area, the data lead-in area, the data area, and the data lead-out area. The information area has a track composed of an embossed-pit train.

The track in the system lead-in area is a continuous spiral track having one round of 360°. The track of each of the data lead-in area, the data area, and the data lead-out area is a continuous spiral track having one round of 360°. The center of the track coincides with the center of the pits.

In the DVD discs used at present, the lead-in area is also provided with any of the reproduction-only type, write-once type, and rewritable type information recording mediums. Further, a pit region, which is called an embossed lead-in area and formed in a fine concavo-convex shape, exists in the rewritable type information recording mediums (DVD-RAM disk and DVD-RW disk) and the write-once type information recording medium (DVD-R disk) in the DVD discs used at present.

In any of the rewritable type and write-once type information recording mediums, the depth of a pit area coincides with the depth of a pregroove (continuous groove) in the data area.

In the DVD-ROM disk used at present, i.e. in the reproduction-only information recording medium in the DVD disk used at present, it is said that the optimum depth of the pit is $\lambda/(4n)$, where $\lambda$ shows a wavelength in use and n shows the refraction factor of a substrate.

In the DVD-ROM disk used at present, i.e. in the rewritable type information recording medium in the DVD disk used at present, it is said that the optimum depth of the pregroove is $\lambda/(5n)$ to $\lambda/(6n)$ as a condition for minimizing crosstalk (amount of leakage to a reproduced signal) from the recording mark of an adjacent track in the data area.

Accordingly, in the DVD-RAM used at present, the pit depth in the embossed lead-in area is set to $\lambda/(5n)$ to $\lambda/(6n)$ in accordance with the above optimum depth.

A reproduced signal having a sufficiently large amplitude can be obtained from the pits having the depth of $\lambda/(4n)$ or $\lambda/(5n)$ to $\lambda/(6n)$ (because the depth of the pits is sufficiently deep).

In comparison with the above-mentioned, in the DVD-R disk used at present, since the depth of the grooves in the data area is very shallow, a reproduced signal having a large amplitude cannot be obtained from the pits, which have the same depth, in the embossed lead-in area, from which a problem arises in that a signal cannot be stably reproduced.

To cope with the above problem, this embodiment is characterized in that the system lead-in area is provided with any of the reproduction-only type, write-once type, and rewritable type information recording mediums and that the track pitch and the shortest pit pitch in the system lead-in area are made greatly larger than the track pitch and the shortest pit pitch (shortest mark pitch) in the data lead-in area and the data area in order to guarantee a stable reproduced signal from the lead-in area of the write-once type information recording medium while securing the compatibility of a format.

In the DVD disk used at present, a reproduced signal is detected using the level slice system (reproduced analog signal is output after it is binarized.).

Figure 4:
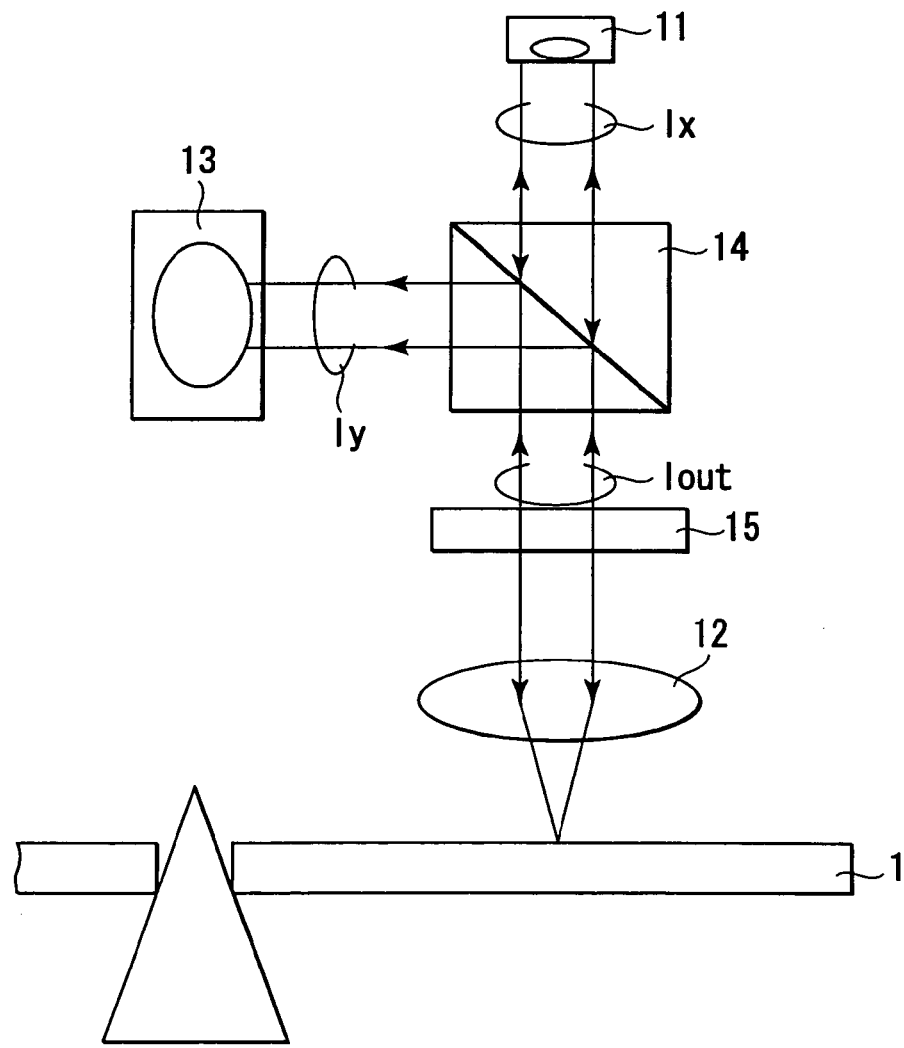
FIG. 4 is a view showing the structure of an optical head.

In the DVD disk used at present, the shortest pit pitch of pits, which are formed in a fine concavo-convex shape, or the shortest mark pitch of recording marks, which are formed by the optical variation of the characteristics of a recording film, is near to the cutoff frequency of the characteristics of the OTF (optical transfer function) of the objective lens used in the reproducing optical head (FIG. 4). Therefore, the amplitude of a reproduced signal from the shortest pit pitch and the shortest mark pitch is greatly reduced.

Further, when the shortest pit pitch and the shortest mark pitch are reduced, it is impossible to detect a reproduced signal by the level slice system. Further, the shortest pit pitch of the write-once type information recording medium used at present (DVD-R disk used at present) is reduced because of the reason described above, a problem arises in that a stable reproduced signal cannot be obtained from the lead-in area.

This embodiment employs the following counter-measures to overcome the contradict problems.

(α) The inside of the lead-in area is separated into the system lead-in area and the data lead-in area, and track pitches of the shortest pit pitches of both the areas are changed.

(β) In the system lead-in area, the track pitch and the shortest pit pitch are greatly increased so that the amount of drop of the amplitude of the reproduced signal from the shortest pit pitch is reduced with respect to the amplitude of the reproduced signal from the longest pit pitch, thereby it is made possible to reproduce a signal from the system lead-in area in the write-once type information recording medium having the shallow pit depth by easily reproducing a signal from the shortest pit pitch.

(γ) The shortest pit pitch and the shortest mark pitch are reduced to increase the recording density of the data lead-in area, the data area, and the data lead-out area for the purpose of increasing the memory capacity of the information recording medium itself.

At this time, the PRML system is employed in place of the current level slice system used at present in which it is difficult to detect a reproduced signal (binarization of an analog signal).

(δ) A modulation system, which is suitable to improve the recording density by reducing the shortest pit pitch and the shortest mark pitch, is employed.

That is, although a minimum numeral, in which "0" continues after modulation is executed (the value of d under the restriction of (d and k) after modulation) is set to d=2 in the DVD used at present, four devises, which employ a modulation rule of d=1 in place of d=2, are used in combination. This can be achieved by the PRML signal processing circuit explained before with reference to FIG. 6.

Note that the track pitch and the shortest pit pitch can be coarsened in the system lead-in area. For this purpose, in the system lead-in area, the reproduced signal is binarized by the level slice system using the level slice signal processing circuit of the signal processing circuit explained before with reference to FIG. 6.

Figure 15:
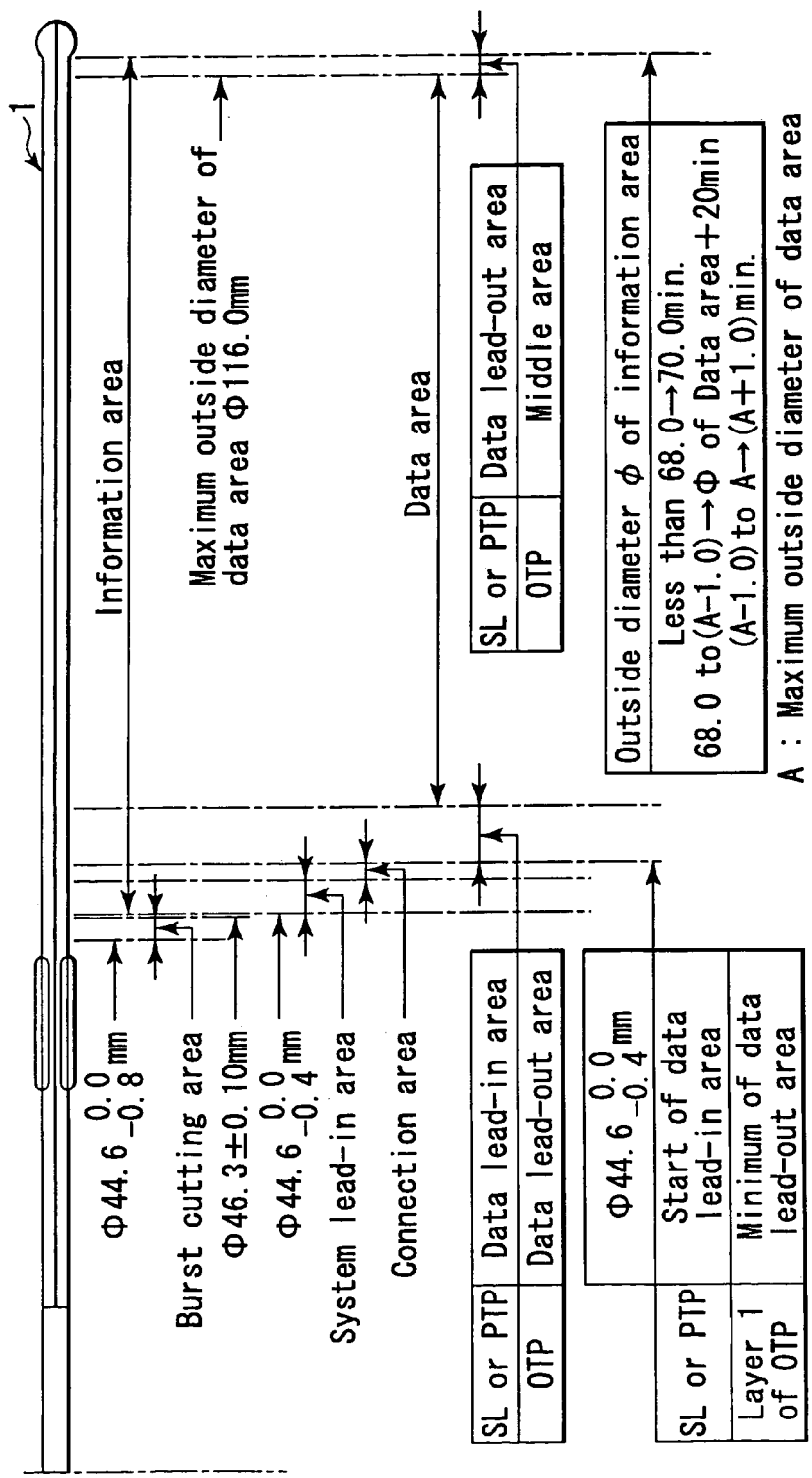
FIG. 15 is a schematic view explaining the mechanical dimensions of the optical disk shown in FIG. 3.

To explain in more detail, as shown in FIG. 15, the mechanical dimension of the information recording medium of the embodiment coincides with that of the DVD standard disk regardless of that the recording medium is any of the reproduction-only type, write-once type, and rewritable type discs.

Accordingly, there are risks as described below:

(a) a user may load an information recording medium of this embodiment on an existing DVD player and an existing DVD recorder by mistake; or (b) a user may load a DVD standard disk on an information reproduction apparatus or an information recording/reproducing apparatus of the embodiment by mistake.

To cope with the above problems, the track pitch and the shortest embossed pit length of the embossed pits in the system lead-in area of the information recording medium of the embodiment are set to a value near to the size of the embossed pit in the lead-in area of the DVD standard disk, so that the new medium can be discriminated from the old medium in the apparatus even if the phenomena described in the items (a) and (b) occur to thereby permit a countermeasure to be stably executed according to a type of the medium.

In the reproduction-only DVD-ROM and the rewritable type DVD-RAM disk that are used at present, emboss-shaped pits are formed in the lead-in area of an inner peripheral portion. In the information reproducing and information recording/reproducing apparatuses that are used at present, however, a signal is detected from the embossed pits of the lead-in area using the level slice system. In the information reproducing and information recording/reproducing apparatuses of this embodiment, the level slice signal processing circuit 23 shown in FIG. 7 is employed to the system lead-in area.

According to the embodiment, the same detection circuit as that explained with reference to FIG. 7 can be also used to the embossed pits existing in the lead-in area of the inner peripheral portion of the reproduction-only DVD-ROM disk and the rewritable type DVD-RAM disk that are used at preset, which can reduce the cost of the information reproducing and information recording/reproducing apparatuses by simplifying the arrangements thereof. An experiment shows that even if the track pitch and the shortest pit length vary ±30%, a slice level can be stably detected by the level slice signal processing circuit 23 shown in FIG. 7.

Slight improvements, which are applied to an existing information reproducing apparatus that cannot reproduce information in the data area of the information recording medium of the embodiment, can make it possible for the existing apparatus to reproduce the information in the system read-in area of the information recording medium of the embodiment using the level slice signal processing circuit built therein. Thus, even if a user executes the erroneous operation shown in the above item (a), it is possible to reproduce the information in the system lead-in area, to discriminate the medium and to notify the user of it.

Figure 29:
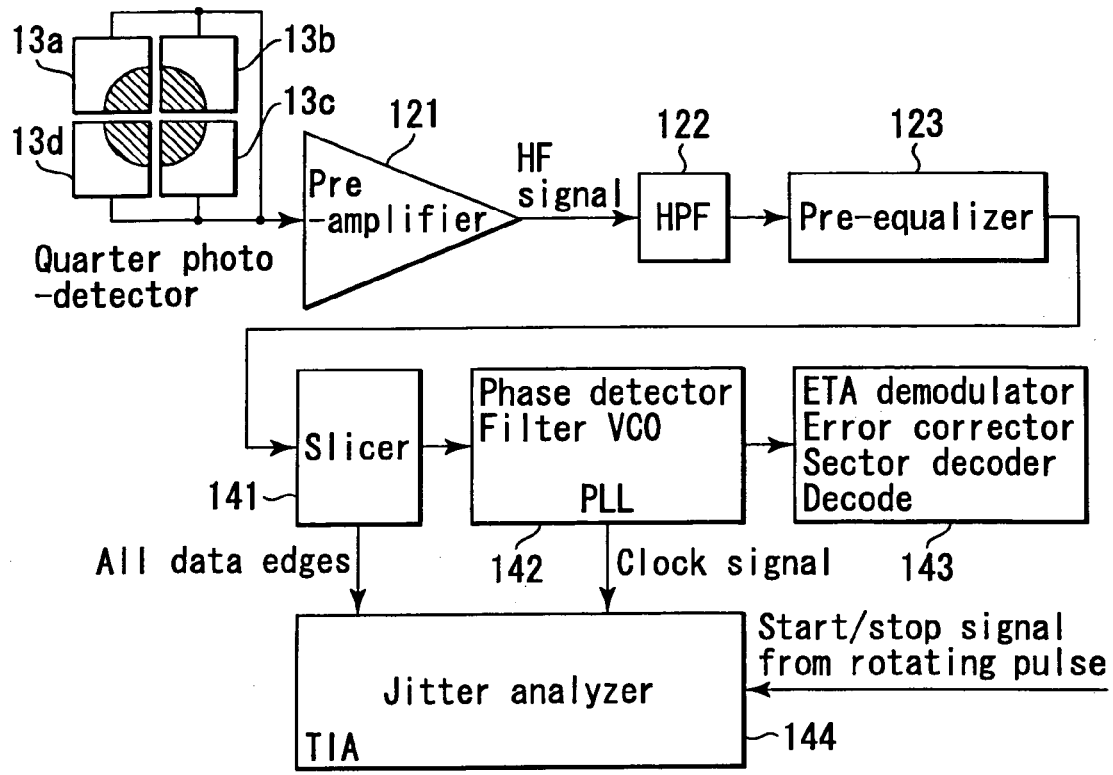
FIG. 29 is a schematic view explaining another example of a signal reproduction circuit including the PRML signal processing circuit (example of a signal detection/signal evaluation circuit used to reproduce a signal in the system lead-in area)

Further, it is preferable to reproduce a signal in the data lead-in area, the data area, and the data lead-out area by the PRML signal processing circuit shown in FIG. 29. Note that the PRML signal processing circuit shown in FIG. 29 is the same as the PRML signal processing circuit explained before with reference to FIG. 7 except that it is shown in more detail.

When the density of recording pits or the recording marks is increased to increase the capacity of the information recording medium, the amplitude of a reproduced signal cannot be obtained at the most dense pit pitch and the most dense recording mark pitch due to the OTF characteristics of the objective lens described above, and thus signal reproduction processing cannot be stably executed by the conventional level slice system. In this embodiment, however, the capacity of the information recording medium can be increased by increasing the density of the recording pits and the recording marks by using the PRML system in the signal reproduction processing.

As explained before with reference to FIG. 13, a reference code zone is formed in the data lead-in area of the reproduction-only information recording medium, and automatic circuit adjustment is used in a reproduction circuit shown in FIG. 29 (in particular, for the setting of respective tap coefficient values in a pre-equalizer 123, and in an AGC 124). That is, the automatic circuit adjustment is executed while reproducing the reference code beforehand to stably reproduce the information recorded on the data area and to stably detect a signal.

Accordingly, the automatic adjustment accuracy of the reproduction circuit can be improved by causing the track pitch and the shortest pit length in the reference code to coincide with the value in the data area by disposing the reference code in the data lead-in area.

Figure 28:
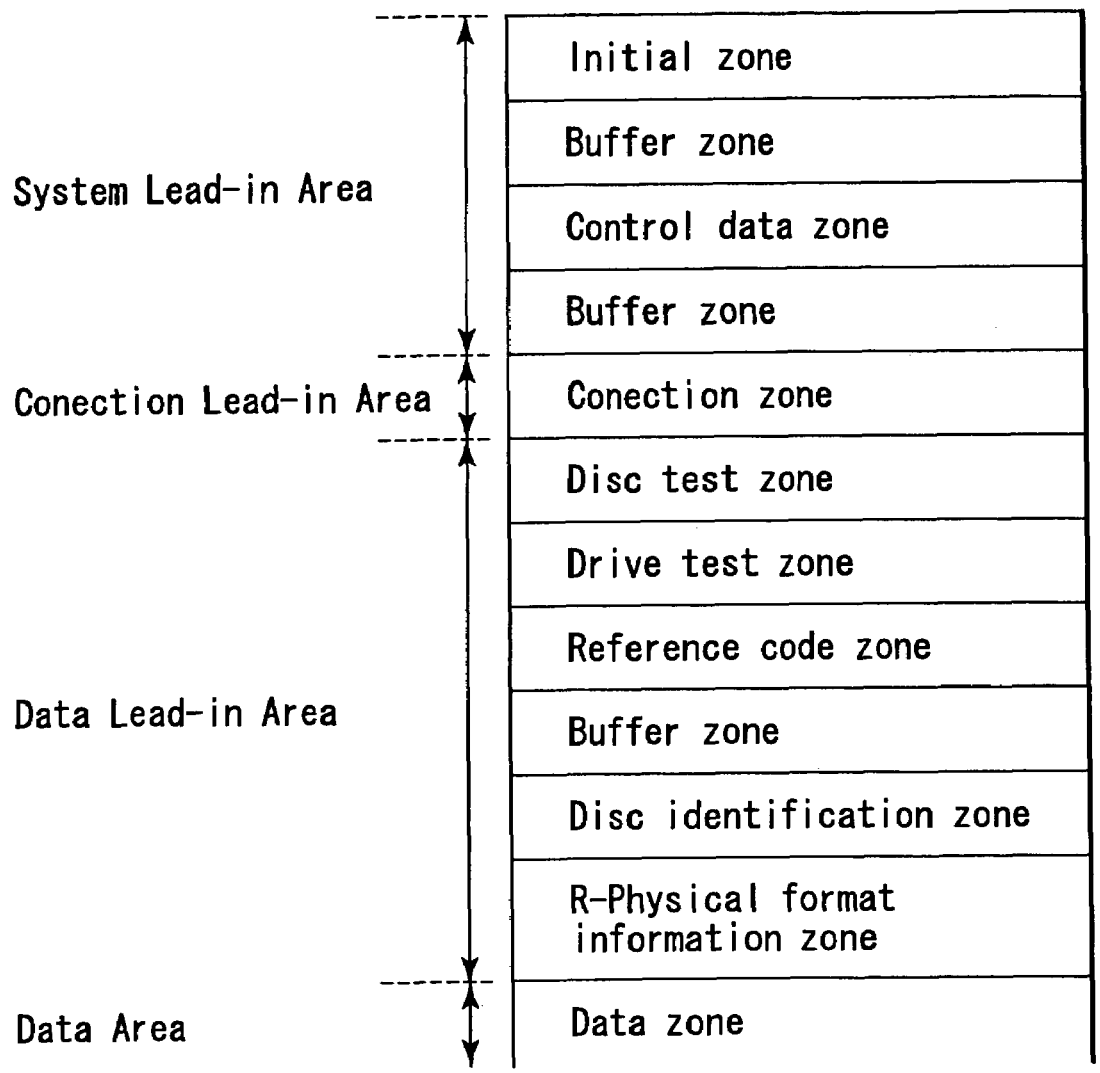
FIG. 28 is a schematic view explaining the arrangements and the data structures of the data lead-in area and the system lead-in area of a write once type optical disk.

FIGS. 26 and 28 show an example that a connection zone (connection area) is interposed between the data lead-in area and the system lead-in area in the recordable disk, i.e. in the write-once type (R) and rewritable type (RAM) information recording medium.

In the recording type information recording medium of this embodiment, the connection zone is interposed between the system lead-in area recorded by the embossed pits and the data lead-in area recorded by the write-once or rewritable recording marks, thereby the system lead-in area is disposed apart from the data lead-in area. The recording type information recording medium of the embodiment has the two recording layers that can record and reproduce information only from one side.

When information is reproduced from one of the recording layers, the laser beam reflected by the other recording layer enters a laser beam detector, from which a phenomenon called interlayer crosstalk occurs, and the characteristics of a reproduced signal are deteriorated by the crosstalk.

In particular, the amount of reflected laser beam is greatly different depending on whether the laser beam reflected by the other recording layer is irradiated to the system lead-in area or to the data lead-in area.

Accordingly, when the laser beam reflected by one of the two recording layers alternately enters the system lead-in area and the data lead-in area due to the difference of the amounts of relative decentering between the two recording layers while the recording layer, from which information is reproduced, is traced once along it, the effect of the interlayer crosstalk is increased. To overcome this problem, this embodiment interposes the connection zone between the system lead-in area recorded by the embossed pits and the data lead-in area recorded by the write-once or rewritable recording marks so that the system lead-in area is disposed apart from the data lead-in area, thereby the effect of the interlayer crosstalk is reduced, and thus a reproduced signal can be stably obtained.

Figure 13:
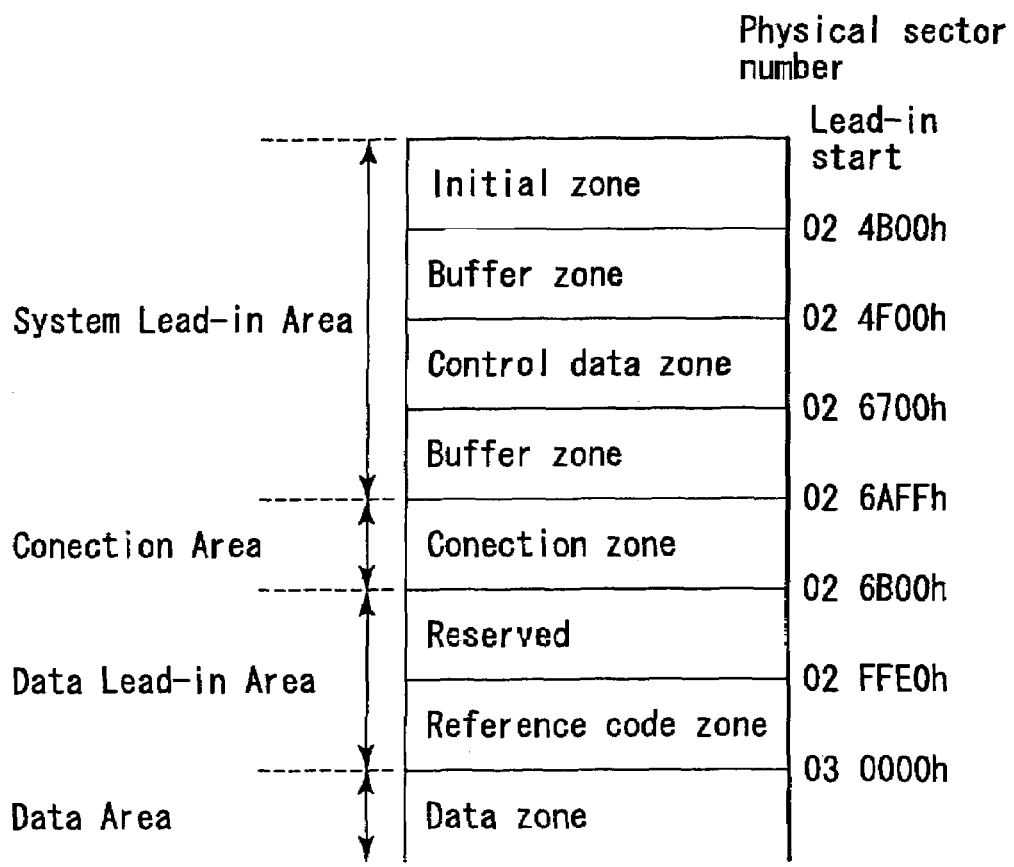
FIG. 13 is a schematic view explaining an example of the data structure of the lead-in area in a reproduction-only optical disk.

In the structure of the reproduction-only information recording medium shown in FIG. 13 as described above, an initial zone and a control data zone are disposed in the system lead-in area and a buffer zone is interposed therebetween. The sector numbers at the start positions of the respective regions are shown on a right column of FIG. 13.

In the system lead-in area shown in FIG. 13, the initial zone includes an embossed data area.

The main data of a data frame recorded as a recorded data area in the initial zone is set to "00h". The buffer zone includes 32 ECC blocks (1024 sectors).

The main data of a data frame recorded in the buffer zone as a physical sector is set to "00h".

The control data zone includes an embossed data area. The data area includes an emboss control data. The connection region is used to connect the system lead-in area to the data lead-in area.

The distance between the center line of a sector "02 6AFFh" at which the system lead-in area ends and the center line of a sector "02 6C00h" at which the data lead-in area starts is set from 1.4 µm to 20.0 µm as an example.

Since no physical sector number is allocated to the connection area, the connection area does not include physical sector number. All the bits of the data lead-in area excluding the reference code zone are reserved. The reference code zone includes embossed data segments. The data area includes an emboss data code.

The reference code is composed of an ECC block (32 sectors) that starts from a sector number 1965576 ("02 FFE0h").

The respective sectors (2048 bytes) of the main data are defined as described below according to the distribution of the main data.

The 2048-byte sector of main data D0 to D2047, in which data symbol "164" is repeated, is created.

The reference code for the 32 sectors is created as described below by adding scramble data to the main data of the sectors.

Sectors 0 to 15

The scramble data of an initial preset value "0Eh" is added to sector main data. However, the scramble data is masked to D0 to D331 of a sector 0 and is not added.

Sectors 16 to 31

The scramble data of the initial preset value "0Eh" is added to the sector main data.

An object of the reference code is to form the 1ECC block length (32 sectors) of a particular pit pattern on a disk. Accordingly, the data of a recording frame before modulation is filled with the data symbol "164" (=0A4h) except ID, EDC, PI, and PO.

Next, a method of creating the main data from the 32 sectors of the reference code will be explained.

Since executing scramble twice means to execute no scramble, a specific data pattern can be simply created after the scramble is executed. The main data byte of the data frame is filled with the specific pattern of data bytes to which a scramble value has been added (which has been previously scrambled). When these previously scrambled data bytes are ordinarily processed, the recorded data area includes all the bytes that represent the particular data pattern.

D0 to D159 of the first sector of the ECC block are not previously scrambled to prevent the uncontrollable large DSV, which appears before modulation unless pre-scramble is masked, of some PO rows in the block including continuous data accompanied with the DSV.

FIG. 14 shows the data structure in the reproduction-only information recording medium having a two-layer structure and a method of allocating sector numbers.

Each of the respective data segments includes 32 physical sectors. The physical sector numbers of both the layers of a single-layer disk or a PTP mode two-layer disk continuously increase in the system lead-in area and continuously increase from the start of a data lead-in area to the end of the data lead-out area in the respective layers.

On an OTP mode two-layer disk, the physical sector numbers of a layer 0 continuously increase in the system lead-in area and continuously increase from the start of the data lead-in area to the end of the middle area in the respective layers.

However, the physical sector numbers of the layer 1 have values obtained by inverting the bits of the physical sector numbers of a layer 0, continuously increase from the start of the middle area (outside) to the end of the data lead-out area (outside), and continuously increase from the outside of the system lead-out area to the inside of the system lead-out area. The first physical sector number of the data area of the layer 1 has a value obtained by inverting the bit of the final physical sector number of the data area of the layer 0. The bit-inverted numeral is calculated such that a bit value is set to 0, and vice-versa.

On the two-layer disk of the parallel track path PTP, the physical sectors on the respective layers having the same sector number have approximately the same distance from the center of the disk.

On the two-layer disk of the opposite track path OTP, the physical sectors on the respective layers having bit-inverted sector numbers have approximately the same distance from the center of the disk.

The physical sector number of the system lead-in area is calculated such that the sector number of the sector located at the end of the system lead-in area is set to 158463 "02 6AFFh".

The physical sector numbers other than that of the system lead-in area are calculated such that the sector number of the sector located at the start of the data area behind the data lead-in area is set to 196608 "03 0000h".

As already explained above, the system lead-in area is provided only with the reproduction-only two layers (opposite track path).

The entire main data of the data frame recorded to the middle area as a physical sectors is set to "00h".

The entire main data of the data frame recorded to the data lead-out area as a physical sector is set to "00h".

The entire main data of the data frame recorded to the system lead-out area as a physical sector is set to "00h".

"00h" described above shows data information before modulation. Accordingly, a channel bit pattern, which has been modulated according to a modulation rule to be described later, is recorded on the information recording medium. As a result, pit trains are disposed everywhere in the data lead-out area and the system lead-out area.

FIG. 16 shows Comparison Table of the data densities in the respective areas of the reproduction-only information recording medium of the embodiment.

In the embodiment, a common system platform can be used even in different recording mediums because a common data structure is employed in the reproduction-only information recording/reproducing medium (ROM medium), the write-once type information recording/reproducing medium (R medium), the rewritable type information recording/reproducing medium (RAM medium) that act as the information recording/reproducing medium, which is advantageous in that final commodities can be easily manufactured and further the reliability of products can be improved.

Although the above advantage can be obtained by using the common platform, unnecessary functions are provided with information recording/reproducing mediums having a different property, from which effective uses can be proposed in view of the property of an information recording medium to be coped with.

As an example of the uses, there is proposed a method of using an area derived from the data structure of the lead-in area as a new effective method of use in view of the property of the information recording/reproducing medium.

The lead-in area in the recording medium such as the R and RAM mediums includes the reproduction-only system lead-in area, which is composed of the embossed pits, and the data lead-in area that records and reproduces data used to a disk drive test, disk test and defect management. However, the function of the data lead-in area used in the recording medium is not necessary in the reproduction-only ROM medium.

In the reproduction-only ROM disk shown in FIG. 13, when a groove recording system is employed in the R type disk, the groove depth in the system lead-in area of the known DVD standard disk must be made shallow from the relationship between the detection of a servo signal and the characteristics of an RF signal when a recorded signal is read out, from which characteristics for reading a signal by the embossed pits must be strictly determined. Accordingly, when it is intended to commonly arrange the respective recording mediums, the recording density of the recording mediums must be lowered in conformity with the recording density of the R type disk.

For this purpose, in a recording mode similar to that of the data area, the signal of the data lead-in area is employed. Thus, in the ROM type disk, a reference code acting as the reference signal of the data area is disposed in the data lead-in area. However, since a large capacity can be used from the range of the area, it is possible to allocate functions specific to the ROM type disk.

The ROM type disk is excellent as a means for distributing information because it can be manufactured on a large scale. There is a possibility that a system, which is different from physical standardization is proposed as an encoding system when the data structure of the above information as well as audio, video, and the like are compressed. That is, in the physical standard of the data structure and the like of the information recording medium, it is desired to define the physical standard as a data storing location and to provide flexibility with the use of it. In contrast, it is desired for many user to make use of the standardization because productivity can be improved thereby. Thus, there is contemplated a method of recording a decoding system for reproducing final signals such as contents and the like together with encoded contents, to read out a decode program in a decoder system, and to decode the encoded contents by a decoding method indicated in the decoder system and to use the contents.

FIG. 17 shows the data arrangement in a control data zone shown in FIG. 13. The structure shown in FIG. 17 is common to any of the reproduction-only, write-once type, and rewritable type information recording mediums.

Further, FIG. 18 shows the contents of physical format information shown in FIG. 17 in the reproduction-only information recording medium.

The information in the physical format information in the information recording medium of this embodiment has common information from a 0th byte (written standard type and part type) to a 16th byte (BCA descriptor) in FIG. 18 in any of the reproduction-only, write-once type, and rewritable type information recording mediums. The text or the code data written in disk manufacturing information is ignored when the information is replaced.

In FIG. 18, BP0 to BP31 include common data used in a DVD family, and BP 32 to BP 2047 are used in information specific to respective blocks.

The functions of respective byte locations will be explained as follows.

(BP 0) Type of written standard and part version (type) (refer to FIG. 19)

Type of Written Standard:
   0100b . . . HD-DVD standard to reproduction-only disk.
   These bits will be allocated to define the DVD written standard issued by DVD Forum. They are allocated according to the following rule.
   0000b . . . DVD standard to reproduction-only disk
   0000b . . . DVD standard to rewritable disk (DVD-RAM)
   0010b . . . DVD standard to write-once disk (DVD-R)
   0011b . . . DVD standard to rewritable disk (DVD-RW)
   0100b . . . HD-DVD standard to reproduction-only disk
   0101b . . . HD-DVD standard to rewritable disk
   Others . . . Reserved
Part version:
   0000b . . . Version 0.9 (Version 0.9 is used only to test and is not applied to ordinary products.)
   0001b . . . Version 1.0

Figure 27:
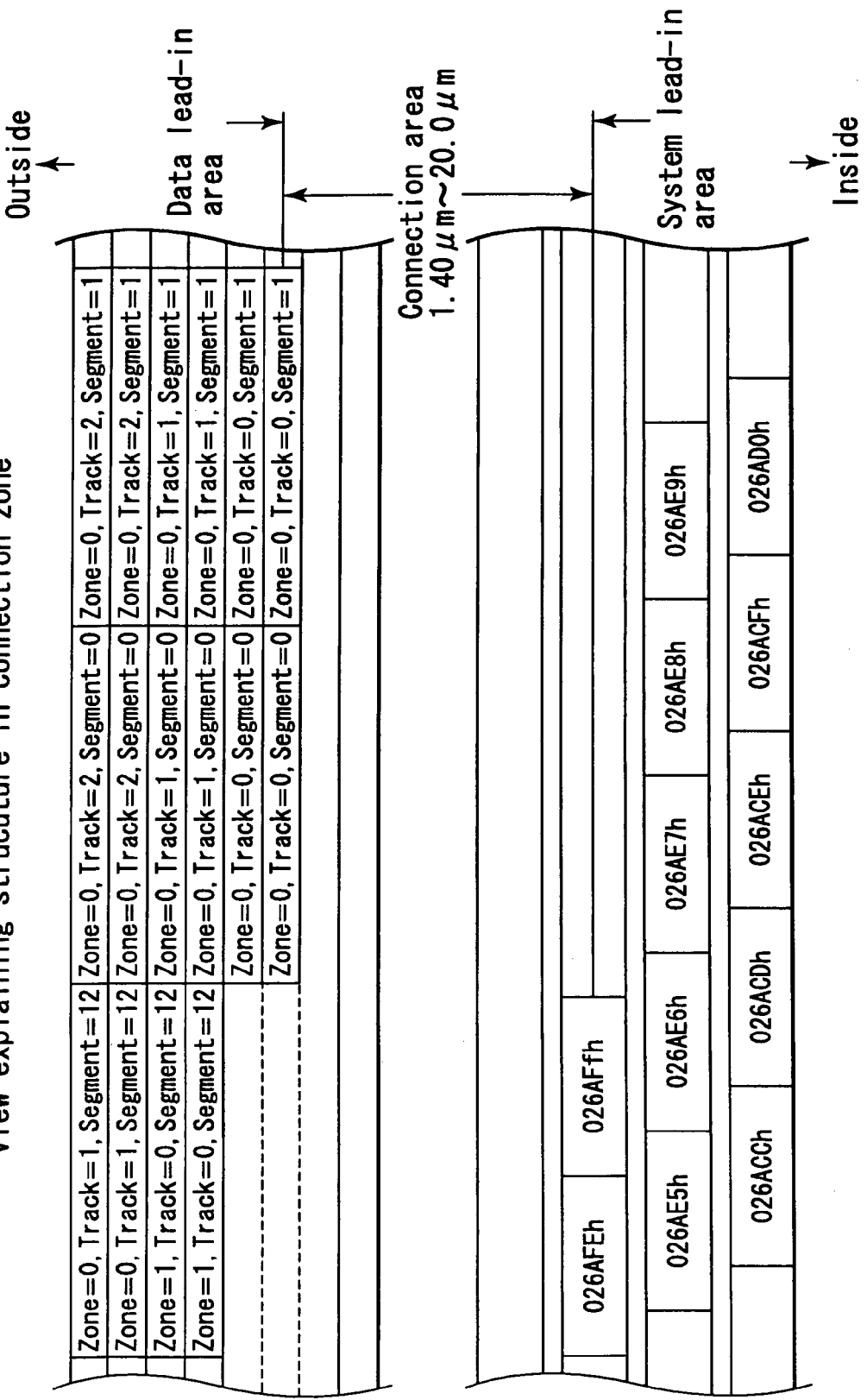
FIG. 27 is a schematic view explaining the structure of a connection zone between the data lead-in area and the system lead-in area.

0100b . . . Version 1.9 (Version 1.9 is used only to test and is not applied to ordinary products.)
0101b . . . Version 2.0
Others . . . Reserved
(BP 1) Disc size and maximum transfer speed of disk (refer to FIG. 20)
Disc size:
0000b . . . 12 cm disk
These bits will be allocated according to the following rule.
0000b . . . 12 cm disk
0001b . . . 8 cm disk
Others . . . Reserved
Maximum transfer speed of disk:
0100b . . . (TBD (to be determined later) Mbps)
These bits will be allocated according to the following rule.
0000b . . . 2.25 Mbps
0001b . . . 5.04 Mbps
0010b . . . 10.08 Mbps
0100b . . . (TBD (to be determined later) Mbps)
1111b . . . not designated
Others . . . Reserved
(BP 2) Disc structure (refer to FIG. 21)
Number of layers:
00b . . . Single layer
01b . . . Two layers
Others . . . Reserved
Track path: 0b . . . PTP or SL
1b . . . OTP
Type of layer:
0100b . . . These bits will be allocated according to the following rule.
b3:0b . . . Emboss user data is recorded in the format of FIG. 14A.
1b . . . Emboss user data is recorded in the format of FIG. 14B.
b2:0b . . . A disk does not include a rewritable user data area.
1b . . . A disk includes a rewritable user data area.
b1:0b . . . A disk does not include a recordable user data area.
1b . . . A disk includes a recordable user data area.
b0:0b . . . A disk does not include an embossed user data area.
1b . . . A disk includes an embossed user data area.
(BP 3) Recording density (refer to FIG. 22) (Linear density) (data area)
0101b . . . 0.153 µm/bit
These bits are allocated according to the following rule.
0000b . . . 0.267 µm/bit
0001b . . . 293 µm/bit
0010b . . . 0.409 to 0.435 µm/bit
0100b . . . 0.280 to 0.291 µm/bit
0101b . . . 0.153 µm/bit
0100b . . . 0.130 to 0.140 µm/bit
Others . . . Reserved
Track density (data area)
0011b . . . 0.40 µm/track (SL disk)
0100b . . . 0.44 µm/track (DL disk)
These bits are allocated according to the following rule.
0000b . . . 0.74 µm/track
0001b . . . 0.80 µm/track (recordable disk)
0010b . . . 0.615 µm/track
0011b . . . 0.40 µm/track (SL disk)
0100b . . . 0.44 µm/track (DL disk)
0101b . . . 0.34 µm/track
Others . . . Reserved
(BP 4 to BP 15) Data area allocation FIG. 23 is a schematic view that explains the contents of information of data area allocation in reproduction-only/write-once type/rewritable type information recording mediums.
(BP 16) BCA descriptor (refer to FIG. 24)
This byte shows whether or not a burst cutting area (BCA) exists on a disk. Bits b6 to b0 are set to "000 0000b", and a bit b7 shows whether or not BCA exists.
These bits are allocated according to the following rule.
BCA flag:
1b . . . BCA exists.
(BP 17 to BP 31) Reserved
All the bytes are set as "00h"
(BP 32 to BP 2047) Reserved
FIG. 25 is a view explaining the recording data densities of the respective regions in the rewritable type information recording medium of this embodiment.
As apparent from the comparison of FIG. 25 with FIG. 16, the various dimensions of the system lead-in area of the reproduction-only information recording medium entirely coincide with those of the system lead-in area of the rewritable type information recording medium. Further, although not shown, in this embodiment, the various dimensions of the system lead-in area of the write-once type information recording medium coincide with the dimensions shown in FIG. 16 or FIG. 25.
FIG. 26 shows the data structure of the lead-in area of the rewritable type information recording medium of this embodiment. In FIG. 26, embossed pits are formed in the system lead-in area shown, and rewritable recording marks are formed in the data lead-in area thereof.
In FIG. 26, an initial zone includes an embossed data area. The main data of the data frame recorded in the initial zone is set to "00h". A buffer zone includes 32 ECC blocks (1024 sectors). The main data of the data frame recorded in the initial zone as a physical sector is set to "00h". A control data zone includes an embossed data area. A data area includes emboss control data.
A connection area is used to connect the system lead-in area to the data lead-in area. As shown in FIG. 27, the distance between the center line of the final sector "02 6BFFh" of the system lead-in area and the center line of the initial sector "02 6C00h" of the data lead-in area is set to 1.4 µm to 20.0 µm as an example.
A physical sector number or a physical address is not allocated to the connection area, it does not include the physical sector number or the physical address.
The data segment of a guard track zone does not include data.
A disk test zone is used by a disk manufacturer to test quality.
A drive test zone is used to execute a drive test.
The information recording/reproducing apparatus optimizes recording conditions by writing trial data in this region.
The disk ID zone in the data lead-in area includes drive information and a reserve area.
The drive information is composed of the respective ECC blocks in a land truck and a groove track and starts from "02 CD00h" in the land track and starts from "82 CD00h" in the groove track.
FIG. 28 shows the data structure of the lead-in area of the write-once type information recording medium of this embodiment.
As shown in FIG. 28, the write-once type information recording medium of this embodiment has a control data zone, which are common to the various types of the mediums, in a system lead-in area in which embossed pits are recorded.

Further, the write-once type information recording medium has a disk test zone for trial write, and a drive test zone, a reference code zone, in which the reference signal for adjusting a reproduction circuit shown in FIG. 14 is recorded, a disk ID zone, and an R-physical format information zone in the data lead-in area thereof in which write-once type marks are recorded.

The write-once type information recording medium of the embodiment is characterized in that a signal is detected in the system lead-in area using the level slice system and a signal is detected in the data lead-out area, the data area, and the data lead-out area using the PRML system.

FIG. 29 shows a signal detection/signal evaluation circuit used to reproduce a signal in the system lead-in area.

The outputs from quarter photo-detectors 13*a* to 13*d* are summed up, and the summed-up output is caused to pass through a high pass filter 122, and subjected to level slicing by a slicer 141 after the waveform thereof is corrected by a pre-equalizer 123.

The circuit shown in FIG. 29 has the following circuit characteristics.

(1) Phase Lock Loop (PLL)
  Natural frequency at 4T: $\omega_n$=300 Krads/sec
  Dumping ratio at 4T: $\delta$=0.70

(2) High pass filter (HPF)
  Primary fc (−3 dB)=1.0 KHz (3) Pre-Equalizer
  For example, the pre-equalizer is a seven-order equiripple filter and has a boot level k1 of 9.0±0.3 dB and a cut-off frequency of 16.5±0.5 MHz as frequency characteristics.

In addition to the above, the circuit shown in FIG. 29 has the following circuit characteristics.

(4) Slicer
  Duty feedback method: fc=5.0 KHz (5) Jitter
  A jitter is measured while a disk makes a quarter rotation in a frequency zone of from 1.0 KHz to HF.

Figure 30:
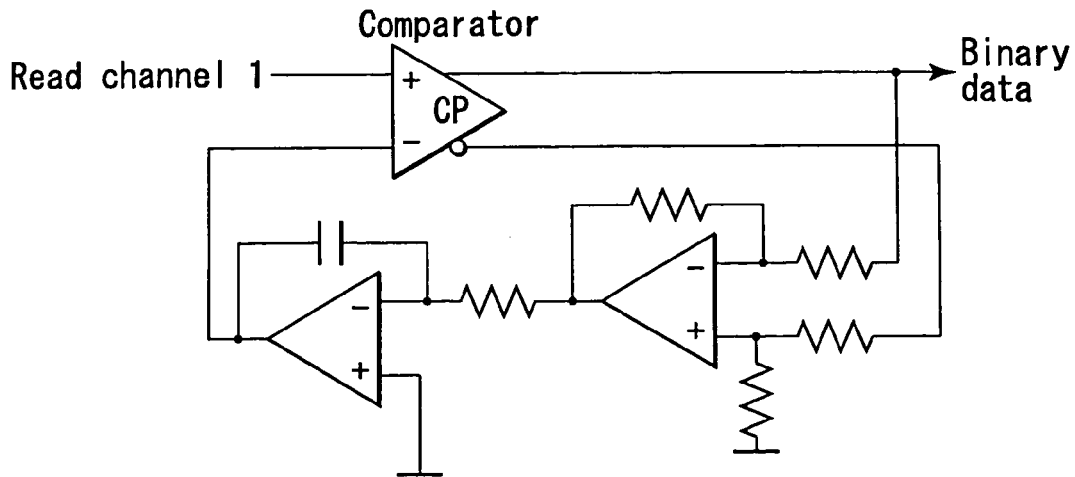
FIG. 30 is a schematic view explaining an example of a slicer shown in FIG. 29.

FIG. 30 is a circuit diagram showing a specific circuit used in the slicer shown in FIG. 29 that acts as a portion where the level slicing is executed.

In the circuit, fundamentally, a signal output from the pre-equalizer (read channel 1) is binarized using a comparator.

Figure 31:
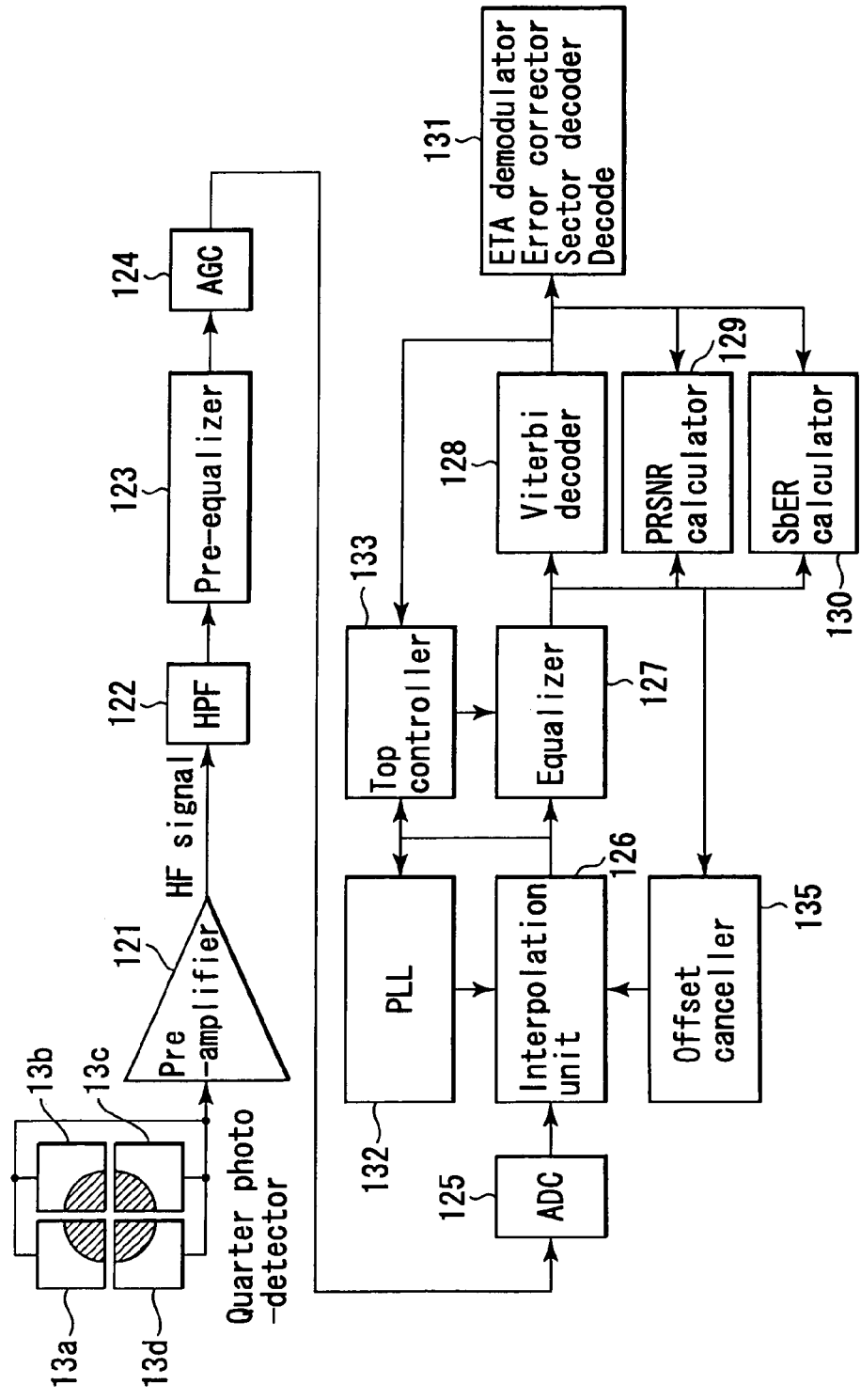
FIG. 31 is a schematic view explaining an example of a signal detection/signal evaluation circuit use to reproduce a signal in the system lead-in area.

A signal is detected in the data lead-in area, the data area, and the data lead-out area of the recording medium using the PRML system, and FIG. 31 shows a circuit diagram of a circuit for detecting the signal. In FIG. 31, the output from quarter photo-detectors are summed up, the summed-up output is caused to pass through a high pass filter 122, and the signal waveform of the summed-up output is used after the waveform is corrected by a pre-equalizer 123, similarly to the circuit arrangement shown in FIG. 29. However, as shown in FIG. 31, a circuit before the output is supplied to a PRML circuit is characterized in that the amplitude of a reproduced signal is controlled to a given level using an automatic gain control (AGC) circuit 124.

In the circuit shown in FIG. 31, the analog signal is converted into a digital signal by an analog to digital converter (ADC) circuit. The characteristics of the circuit shown in FIG. 31 are summarized as shown below.

(1) Phase Lock Loop (PLL)
  Natural frequency at 4T: $\omega_n$=580 Krads/sec
  Dumping ratio at 4T: $\delta$=1.1

(2) High Pass Filter (HPF)
  Primary fc (−3 dB)=1.0 KHz (3) Pre-Equalizer
  For example, the pre-equalizer is a seven-order equiripple filter and has a boot level k1 of 9.0±0.3 dB and a cut-off frequency of 16.5±0.5 MHz as frequency characteristics.

(4) Automatic Gain Control (AGC)
  −3 dB closed loop zone: 100 Hz (5) Analog to Digital Conversion (ADC)
  Relationship between ADC and the dynamic range of an HF signal
  Sample clock: 72 MHz
  Resolution: 8 bits, $I_{111}$ level: 64±5
  $I_{111}$ level: 192±5

(8) Equalizer
  A 9-tap transversal filter is used as an equalizer. A coefficient is controlled by a tap controller.
  Resolution of tap coefficient: 7 bits
  Resolution of equivalent signal: 7 bits (9) Tap Controller
  The tap coefficient of the equalizer is calculated by a minimum square error (MSE) algorithm. An initial value is used as the tap coefficient before it is calculated.

Figure 32:
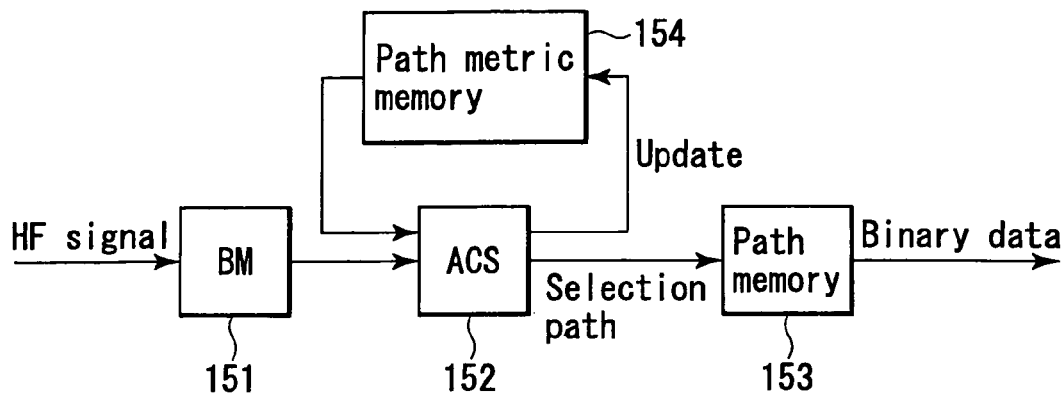
FIG. 32 is a schematic view explaining an example of a Viterbi decoder used in the signal evaluation circuit shown in FIG. 31.

FIG. 32 shows the structure of a Viterbi decoder 128 used in the signal evaluation circuit shown in FIG. 31. In this embodiment, PR(1,2,2,2,1) is employed as a PR class.

The read channels from the data lead-in area, the data area, and the data lead-out area are combined with an ETM code so as to be in conformity with a PR(1,2,2,2,1) channel.

Figure 33:
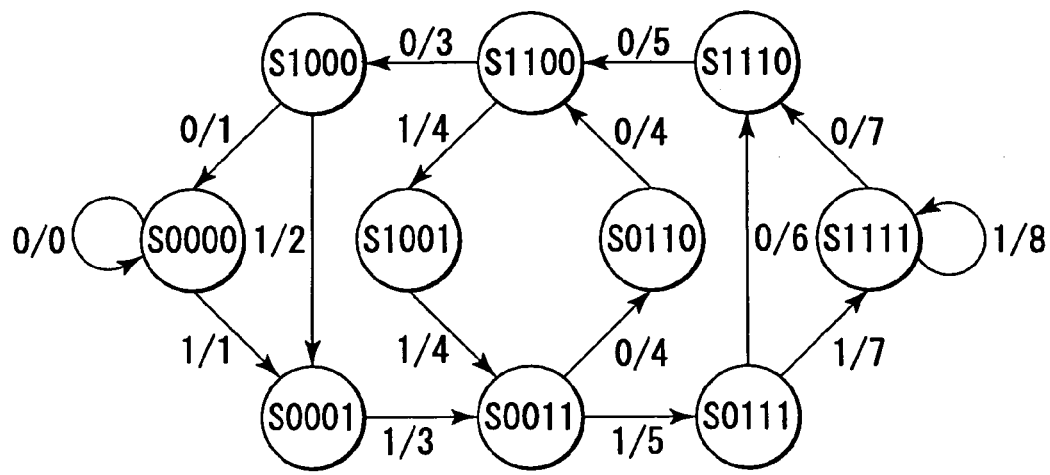
FIG. 33 is a schematic view explaining an example of calculation of a path metric at a time t.

FIG. 33 shows the transition of state of the PR channel.

Sabcd shows that a previous 4-bit input is abcd, and e/f shows that next input data is e and a signal level is f.

The Viterbi decoder outputs binary data from an equivalent signal as shown below.

A branch metric at a time t is calculated as shown below.

$$BM(t, i)=(y_t-i)^2$$

where, $y_t$ shows an HF signal after it is equalized, and i=0, 1, . . . 8.

The resolution of the branch metric is equal to or larger than 10 bits.

As shown in FIG. 33, the path metric at time t is calculated as shown below.

$$PM(t, S0000)=\min\{PM(t-1, S0000)+BM(t, 0), PM(t-1, S1000)+BM(t, 1)\}$$

$$PM(t, S0001)=\min\{PM(t-1, S0000)+BM(t, 1), PM(t-1, S1000)+BM(t, 2)\}$$

$$PM(t, S0011)=\min\{PM(t-1, S0001)+BM(t, 3), PM(t-1, S1001)+BM(t, 4)\}$$

$$PM(t, S0110)=PM(t-1, S0011)+BM(t, 4)$$

$$PM(t, S0111)=PM(t-1, S0011)+BM(t, 5)$$

$$PM(t, S1000)=PM(t-1, S1100)+BM(t, 3)$$

$$PM(t, S1001)=PM(t-1, 11000)+BM(t, 4)$$

$$PM(t, S1100)=\min\{PM(t-1, S0110)+BM(t, 4), PM(t-1, S1110)+BM(t, 5)\}$$

$$PM(t, S1110)=\min\{PM(t-1, S0111)+BM(t, 6), PM(t-1, S1111)+BM(t, 7)\}$$

$$PM(t, S1111)=\min\{PM(t-1, S0111)+BM(t, 7), PM(t-1, S1111)+BM(t, 8)\}$$

The resolution of the path metric is equal to or larger than 11 bits.

An add-compare-select block (that corresponds to the ML decoder shown in FIG. 7) calculates a new path metric, supplies the new path metric to a path metric memory, and supplies a selection to a path memory.

select 0=0

(case of $(PM(t-1, S0000)+BM(t, 0)<PM(t-1, S1000)+BM(t, 1))$ select 0=1 (cases other than above)

select 1=0

(case of $(PM(t-1, S0000)+BM(t, 1)<PM(t-1, S1000)+BM(t, 2))$ select 1=1 (cases other than above)

select 2=0

(case of $(PM(t-1, S0001)+BM(t, 3)<PM(t-1, S1001)+BM(t, 4))$ select 2=1 (cases other than above)

select 3=0

(case of $(PM(t-1, S0110)+BM(t, 4)<PM(t-1, S1110)+BM(t, 5))$ select 3=1 (cases other than above)

select 4=0

(case of $(PM(t-1, S0111)+BM(t, 6)<PM(t-1, S1111)+BM(t, 7))$ select 4=1 (cases other than above)

select 5=0

(case of $(PM(t-1, S0111)+BM(t, 7)<PM(t-1, S1111)+BM(t, 8))$ select 5=1 (cases other than above)

Figures 34, 35:
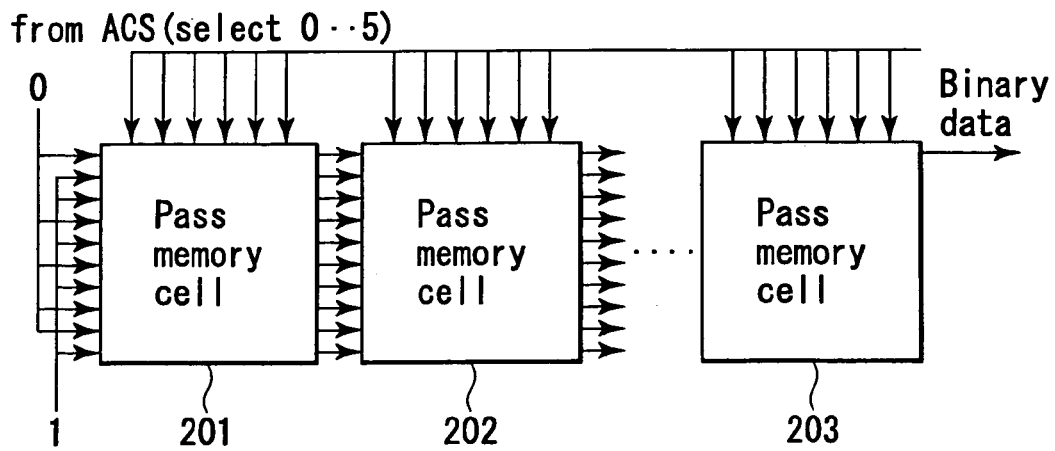
FIG. 34 is a schematic view explaining an example of a path memory.
FIG. 35 is a schematic view explaining an example of the arrangements of an I/O and a path memory cell.
Figure 36:
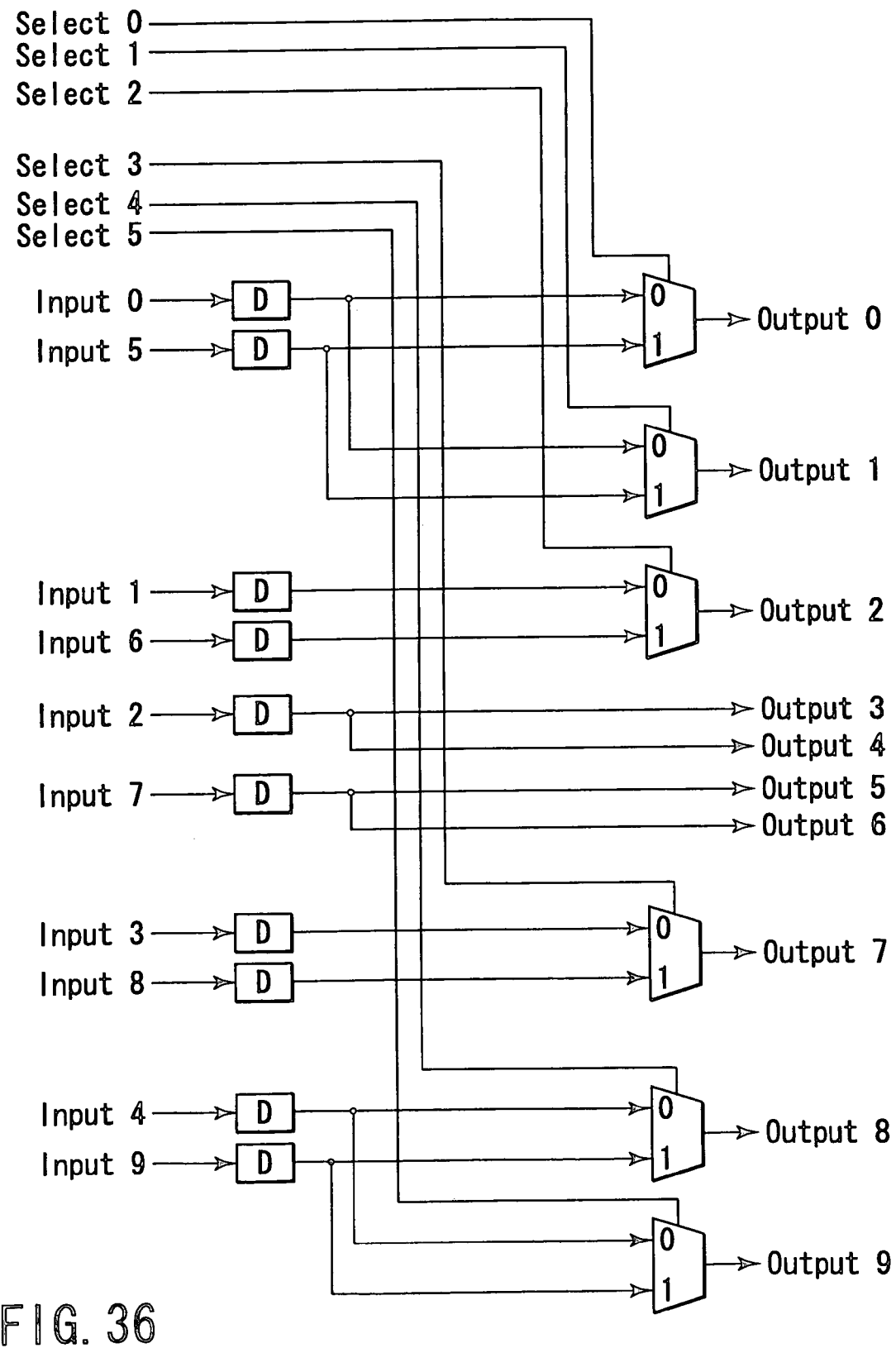
FIG. 36 is a schematic view explaining an output from a final path memory cell.

FIG. 34 shows an example of the path memory. The path memory has, for example, 20 memory cells. FIG. 35 shows the arrangements of an I/O and a path memory cell. As shown in FIG. 36, a final path memory cell outputs only one signal as binary data from an output 0.

As described above, in the optical disk of the present invention, from which information can be reproduced by the laser beam having the wavelength of 405 nm and on which information can be recorded by the laser beam having the same wavelength, and the optical disk apparatus of the present invention, which records information on the optical disk and reproduce information therefrom, a signal can be reproduced by the level slice system until the level of double refraction reaches a predetermined magnitude in any type of optical discs, that is, any of the reproduction-only optical disk, the only-once-recordable (write-once type) optical disk, and the recording/reproducing optical disk (RAM disk), and, in the optical disk, which includes double refraction that has such a level as to reduce signal intensity when a signal is reproduced by the level slice system, the signal can be reproduced using the PRML system within the range of an appropriate error rate that is one rank higher than that in the level slice system.

Further, it is admitted that a margin is increased with respect to a decrease in the signal intensity by employing the PRML system.

Further, as to the level of the double refraction included in respective types of the optical discs, when the level permits a reproduced signal to be obtained within the range of a predetermined error rate, the level is set to:

100 nm in the DVD standard read-only disk (Standard ECMA-267, p15);

100 nm in the DVD-R that on which information can be record only once;(Standard ECMA-279, p16) and 60 nm in the DVD-RAM on which information can be rewritten (Standard ECMA-272, p13).

The present invention is by no means limited to the above respective embodiments, and it goes without saying that various modifications and changes can be made within the range that does not depart from the gist of the claimed invention when the invention is embodied. Further, the respective embodiments may be embodied by being combined with each other as far as possible, and an effect of combination can be obtained in this case.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk comprising:
   two molded substrates molded by injection molding, bonded together, and having information marks transferred thereto; and
   a recording film disposed between the molded substrates and capable of recording information only once by a laser beam having a wavelength of 600 nm or less is formed, and on and from which information can be recorded and reproduced, or on which a reflection film is formed so as to reproduce information from the optical disk,
   wherein the bonded and molded substrates including the recording film have a magnitude of a birefringence ±85 nm or less when measured by a double pass mode of measurement in reflection, when PRML signal processing is used to reproduce the information.

2. An optical disk according to claim 1, wherein the magnitude of the birefringence of the optical disk is +75 nm or less when measured by the double pass.

3. An optical disk comprising:
   two molded substrates molded by injection molding, bonded together, and having information marks transferred thereto; and
   a recording film disposed between the molded substrates and capable of recording and erasing information is formed, and on and from which information can be recorded and reproduced using a laser beam having a wavelength of 600 nm or less,
   wherein the bonded and molded substrates including the recording film have a magnitude of a birefringence ±70 nm or less when measured by a double pass mode of measurement in reflection, when PRML signal processing is used to reproduce the information.

4. An optical disk according to claim 3, wherein the magnitude of a double refraction component of the optical disk is +55 nm or less when measured by a double pass mode of measurement in reflection, when PRML signal processing is used to reproduce the information.

5. An optical disk comprising:

two molded substrates molded by injection molding, bonded together, and having information marks transferred thereto; and a recording film disposed between the molded substrates and capable of recording information only once by a laser beam having a wavelength of 600 nm or less is formed, and on and from which information can be recorded and reproduced, or on which a reflection film having a track pitch of 0.40 μm and a minimum mark length of 0.204 μm being formed to have a thickness of 0.6 mm so as to reproduce information from the optical disk, wherein the bonded and molded substrates including the recording film have a magnitude of a birefringence ±60 nm or less when measured by a double pass mode of measurement in reflection.

6. An optical disk comprising:

two molded substrates molded by injection molding, bonded together, and having information marks transferred thereto; and a recording film disposed between the molded substrates and capable of recording and erasing information is formed, and on and from which information can be recorded and reproduced using a laser beam having a wavelength of 600 nm or less, the reflection film having a track pitch of 0.34 μm and a minimum mark length of 0.187 μm being formed to have a thickness of 0.6 mm so as to reproduce information from the optical disk, wherein the bonded and molded substrates including the recording film have a magnitude of a bireflingence ±40 nm or less when measured by a double pass mode of measurement in reflection.

* * * * *